United States Patent
McGaugh et al.

(10) Patent No.: US 11,961,075 B2
(45) Date of Patent: Apr. 16, 2024

(54) SYSTEMS FOR PROCESSING ELECTRONIC TRANSACTIONS

(71) Applicant: Royal Bank of Canada, Montreal (CA)

(72) Inventors: Timothy Dean McGaugh, Toronto (CA); Edison U. Ortiz, Orlando, FL (US); Terry W. C. Lee, Toronto (CA); Jeremy Paul Bornstein, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 969 days.

(21) Appl. No.: 14/879,913

(22) Filed: Oct. 9, 2015

(65) Prior Publication Data

US 2016/0104155 A1    Apr. 14, 2016

Related U.S. Application Data

(60) Provisional application No. 62/062,467, filed on Oct. 10, 2014.

(51) Int. Cl.
*G06Q 20/40* (2012.01)
*G06Q 20/20* (2012.01)
(Continued)

(52) U.S. Cl.
CPC ........... *G06Q 20/401* (2013.01); *G06Q 20/20* (2013.01); *G06Q 20/32* (2013.01); *G06Q 20/325* (2013.01);
(Continued)

(58) Field of Classification Search
CPC .... G06F 21/43; G06Q 20/40; G06Q 20/3223; G06Q 20/387; H04W 12/08; H04W 2215/54
See application file for complete search history.

(56) References Cited

U.S. PATENT DOCUMENTS 5,668,760 A    9/1997  Hazen
5,668,876 A    9/1997  Falk et al.
(Continued)

FOREIGN PATENT DOCUMENTS

CA    2837208    12/2012
CA    2852059    4/2013
(Continued)

OTHER PUBLICATIONS

J. Gao, V. Kulkarni, H. Ranavat, L. Chang and H. Mei, "A 2D Barcode-Based Mobile Payment System," 2009 Third International Conference on Multimedia and Ubiquitous Engineering, 2009, pp. 320-329, doi: 10.1109/MUE.2009.62. (Year: 2009).*
(Continued)

*Primary Examiner* — Neha Patel
*Assistant Examiner* — Jahed Ali
(74) *Attorney, Agent, or Firm* — Norton Rose Fulbright Canada LLP

(57) ABSTRACT

A computer-implemented platform (1000) for conducting an electronic payment transaction between a user (104) and a merchant (102, 103) is provided. The platform (104) includes a computer system (100) configured for the generation of a data structure containing payment data; a mobile device (106, 800) associated with a user (104) configured to use the data structure generated by the computer system (100) to communicate an electronic message reflecting payment instructions; and a merchant or processing terminal (102, 103, 108) configured for communication with the mobile device (106) to receive the electronic message, and formulate a request to process the electronic payment transaction. Corresponding methods and computer-readable media are also provided.

18 Claims, 12 Drawing Sheets

(51) Int. Cl.
  *G06Q 20/32* (2012.01)
  *G06Q 20/38* (2012.01)
  *G06Q 20/42* (2012.01)

(52) U.S. Cl.
  CPC ..... *G06Q 20/3276* (2013.01); *G06Q 20/3278* (2013.01); *G06Q 20/3821* (2013.01); *G06Q 20/405* (2013.01); *G06Q 20/425* (2013.01); *G06Q 2220/00* (2013.01)

(56) References Cited

U.S. PATENT DOCUMENTS

| | | | |
|---|---|---|---|
| 6,439,464 | B1 | 8/2002 | Fruhauf et al. |
| 6,763,399 | B2 | 7/2004 | Margalit et al. |
| 6,883,715 | B1 | 4/2005 | Fruhauf et al. |
| 6,988,657 | B1 | 1/2006 | Singer et al. |
| 6,991,173 | B2 | 1/2006 | Fruhauf |
| 7,011,247 | B2 | 3/2006 | Drabczuk et al. |
| 7,150,397 | B2 | 12/2006 | Morrow et al. |
| 7,249,266 | B2 | 7/2007 | Marglait et al. |
| 7,438,218 | B2 | 10/2008 | Dooley et al. |
| 7,529,700 | B1 | 5/2009 | Kessler |
| 7,647,404 | B2 | 1/2010 | Cooper et al. |
| 7,739,197 | B2 * | 6/2010 | Jambunathan ..... G06Q 20/3821 705/72 |
| 7,761,380 | B2 | 7/2010 | Katz |
| 7,848,980 | B2 * | 12/2010 | Carlson ................. G06Q 20/40 705/35 |
| 8,046,495 | B2 | 10/2011 | Cooper et al. |
| 8,112,353 | B2 | 2/2012 | Li et al. |
| 8,121,874 | B1 | 2/2012 | Guheen et al. |
| 8,151,345 | B1 | 4/2012 | Yeager |
| 8,260,199 | B2 | 9/2012 | Kowalski |
| 8,332,272 | B2 | 12/2012 | Fisher |
| 8,352,749 | B2 | 1/2013 | von Behren et al. |
| 8,391,837 | B2 | 3/2013 | Corda |
| 8,417,643 | B2 | 4/2013 | Mardikar |
| 8,468,580 | B1 | 6/2013 | Casey et al. |
| 8,548,924 | B2 | 10/2013 | Yeager |
| 8,549,279 | B1 | 10/2013 | Sahasranaman et al. |
| 8,560,449 | B1 | 10/2013 | Sears et al. |
| 8,655,787 | B1 | 2/2014 | Griffin et al. |
| 8,682,802 | B1 * | 3/2014 | Kannanari ......... G06Q 20/3274 705/64 |
| 8,686,802 | B1 | 3/2014 | Kannanari |
| 8,751,294 | B2 | 6/2014 | Bhattacharya |
| 8,818,867 | B2 | 8/2014 | Baldwin et al. |
| 9,082,119 | B2 | 7/2015 | Ortiz et al. |
| 9,177,313 | B1 | 11/2015 | Silverman |
| 9,195,984 | B1 * | 11/2015 | Spector ............... G06Q 20/367 |
| 9,269,083 | B1 | 2/2016 | Jarajapu |
| 9,305,295 | B2 | 4/2016 | Laracey |
| 9,336,519 | B2 | 5/2016 | Young |
| 9,424,574 | B2 | 8/2016 | Bondesen et al. |
| 9,684,893 | B2 * | 6/2017 | Singhal ................ G06Q 20/027 |
| 9,715,681 | B2 | 7/2017 | Hammad |
| 9,721,238 | B2 * | 8/2017 | Salmon ................ G06Q 20/227 |
| 9,792,593 | B2 | 10/2017 | Hayhow |
| 9,836,727 | B1 | 12/2017 | Brennan |
| 9,836,739 | B1 | 12/2017 | Borovsky |
| 10,055,740 | B2 * | 8/2018 | Hanson ................ G06Q 30/00 |
| 10,078,835 | B2 * | 9/2018 | Radu ................ G06Q 20/20 |
| 10,509,949 | B1 * | 12/2019 | Mossoba .......... G06V 40/172 |
| 10,521,780 | B1 | 12/2019 | Hopkins |
| 11,232,456 | B2 * | 1/2022 | Hyun .................. G06Q 20/40 |
| 2002/0002538 | A1 | 1/2002 | Ling |
| 2002/0169984 | A1 * | 11/2002 | Kumar .................. G06Q 20/12 726/4 |
| 2003/0028481 | A1 * | 2/2003 | Flitcroft ................ G06Q 20/40 705/39 |
| 2004/0073688 | A1 | 4/2004 | Sampson |
| 2005/0097060 | A1 | 5/2005 | Lee et al. |
| 2006/0080545 | A1 | 4/2006 | Bagly et al. |
| 2006/0235761 | A1 | 10/2006 | Johnson |
| 2006/0235795 | A1 | 10/2006 | Johnson |
| 2006/0235796 | A1 | 10/2006 | Johnson |
| 2006/0255158 | A1 | 11/2006 | Margalit et al. |
| 2007/0088952 | A1 | 4/2007 | Hewitt et al. |
| 2007/0125838 | A1 | 6/2007 | Law et al. |
| 2007/0143828 | A1 | 6/2007 | Jeal |
| 2007/0255653 | A1 | 11/2007 | Tumminaro et al. |
| 2007/0256124 | A1 | 11/2007 | Ih |
| 2008/0040285 | A1 | 2/2008 | Wankmueller |
| 2008/0072064 | A1 * | 3/2008 | Franchi ................. G06F 21/34 713/186 |
| 2008/0103923 | A1 | 5/2008 | Rieck et al. |
| 2008/0133350 | A1 * | 6/2008 | White ................ G06Q 30/0226 705/14.27 |
| 2008/0163257 | A1 | 7/2008 | Carlson |
| 2008/0283591 | A1 | 11/2008 | Oder et al. |
| 2009/0064294 | A1 * | 3/2009 | Cook ..................... H04L 9/3234 726/9 |
| 2009/0104886 | A1 | 4/2009 | Minamino et al. |
| 2009/0104888 | A1 | 4/2009 | Cox |
| 2009/0240620 | A1 | 9/2009 | Kendrick et al. |
| 2009/0254440 | A1 * | 10/2009 | Pharris ................. G06Q 20/204 705/40 |
| 2009/0271262 | A1 * | 10/2009 | Hammad ............... G06Q 20/04 709/204 |
| 2009/0294527 | A1 | 12/2009 | Brabson et al. |
| 2010/0030697 | A1 | 2/2010 | Goodrich et al. |
| 2010/0042538 | A1 | 2/2010 | Dheer et al. |
| 2010/0063893 | A1 | 3/2010 | Townsend |
| 2010/0094755 | A1 | 4/2010 | Kloster |
| 2010/0122274 | A1 | 5/2010 | Gillies et al. |
| 2010/0145860 | A1 | 6/2010 | Pelegero |
| 2010/0148928 | A1 | 6/2010 | Yeager et al. |
| 2010/0211440 | A1 * | 8/2010 | Leshem .............. G06Q 30/0284 705/13 |
| 2010/0241867 | A1 * | 9/2010 | Brown ............ G06Q 20/40975 713/185 |
| 2010/0257612 | A1 | 10/2010 | McGuire et al. |
| 2010/0274692 | A1 | 10/2010 | Hammad |
| 2010/0306076 | A1 | 12/2010 | Taveau et al. |
| 2011/0161233 | A1 | 6/2011 | Tieken |
| 2011/0166992 | A1 | 7/2011 | Dessert |
| 2011/0208659 | A1 | 8/2011 | Easterly et al. |
| 2011/0225090 | A1 | 9/2011 | Hammad |
| 2011/0251892 | A1 | 10/2011 | Laracey |
| 2011/0307710 | A1 | 12/2011 | McGuire et al. |
| 2011/0320344 | A1 | 12/2011 | Faith et al. |
| 2012/0005038 | A1 | 1/2012 | Soman |
| 2012/0028609 | A1 | 2/2012 | Hruska |
| 2012/0030044 | A1 | 2/2012 | Hurst |
| 2012/0030047 | A1 | 2/2012 | Fuentes |
| 2012/0031969 | A1 | 2/2012 | Hammad |
| 2012/0036042 | A1 | 2/2012 | Graylin |
| 2012/0041881 | A1 | 2/2012 | Basu et al. |
| 2012/0078735 | A1 | 3/2012 | Bauer et al. |
| 2012/0078782 | A1 | 3/2012 | Schoenberg et al. |
| 2012/0084210 | A1 | 4/2012 | Farahmand |
| 2012/0116902 | A1 | 5/2012 | Cardina et al. |
| 2012/0131655 | A1 | 5/2012 | Bender et al. |
| 2012/0150668 | A1 | 6/2012 | Wade |
| 2012/0159163 | A1 * | 6/2012 | Von Behren ........ G06Q 20/3823 713/168 |
| 2012/0173432 | A1 | 7/2012 | Yeager |
| 2012/0197797 | A1 | 8/2012 | Grigg |
| 2012/0203700 | A1 | 8/2012 | Ornce et al. |
| 2012/0209657 | A1 * | 8/2012 | Connolly ........... G06Q 20/3224 705/26.7 |
| 2012/0209749 | A1 | 8/2012 | Hammad |
| 2012/0214443 | A1 | 8/2012 | Daigle |
| 2012/0239417 | A1 | 9/2012 | Pourfallah et al. |
| 2012/0259782 | A1 | 10/2012 | Hammad |
| 2012/0260324 | A1 | 10/2012 | Lenon et al. |
| 2012/0267432 | A1 | 10/2012 | Kuttuva |
| 2012/0271705 | A1 * | 10/2012 | Postrel ................. G06Q 20/201 705/14.33 |
| 2012/0259781 | A1 | 11/2012 | Fote et al. |
| 2012/0290376 | A1 | 11/2012 | Dryer |
| 2012/0296725 | A1 * | 11/2012 | Dessert ................ G06Q 20/20 705/14.27 |

(56) References Cited

U.S. PATENT DOCUMENTS

| | | | |
|---|---|---|---|
| 2012/0316992 A1* | 12/2012 | Oborne | G06Q 20/384 705/26.41 |
| 2012/0317036 A1 | 12/2012 | Bower et al. | |
| 2012/0317628 A1 | 12/2012 | Yeager | |
| 2012/0330787 A1* | 12/2012 | Hanson | G06Q 30/00 705/26.41 |
| 2013/0006860 A1 | 1/2013 | Balasubramanian et al. | |
| 2013/0018793 A1 | 1/2013 | Wong | |
| 2013/0024383 A1 | 1/2013 | Kannappan | |
| 2013/0031006 A1 | 1/2013 | McCullagh et al. | |
| 2013/0036048 A1 | 2/2013 | Campos et al. | |
| 2013/0041823 A1 | 2/2013 | Wagner | |
| 2013/0054474 A1 | 2/2013 | Yeager | |
| 2013/0030618 A1 | 3/2013 | Barton et al. | |
| 2013/0060618 A1 | 3/2013 | Barton et al. | |
| 2013/0060708 A1* | 3/2013 | Oskolkov | G06Q 20/10 705/42 |
| 2013/0091061 A1 | 4/2013 | Caulkett et al. | |
| 2013/0095810 A1 | 4/2013 | Moreton et al. | |
| 2013/0097081 A1 | 4/2013 | Leavitt et al. | |
| 2013/0110658 A1 | 5/2013 | Lyman et al. | |
| 2013/0110675 A1 | 5/2013 | Bouw | |
| 2013/0124346 A1* | 5/2013 | Baldwin | G06Q 20/4015 705/16 |
| 2013/0138521 A1 | 5/2013 | Want et al. | |
| 2013/0151405 A1 | 6/2013 | Head et al. | |
| 2013/0166913 A1 | 6/2013 | Lenon | |
| 2013/0179352 A1* | 7/2013 | Dwyre | G06Q 20/401 705/71 |
| 2013/0214898 A1* | 8/2013 | Pineau | H04W 4/023 340/5.6 |
| 2013/0218657 A1 | 8/2013 | Salmon | |
| 2013/0218769 A1* | 8/2013 | Pourfallah | G06Q 20/325 705/44 |
| 2013/0238455 A1 | 9/2013 | Laracey | |
| 2013/0254117 A1 | 9/2013 | von Mueller | |
| 2013/0268687 A1* | 10/2013 | Schrecker | H04W 12/06 709/229 |
| 2013/0275308 A1 | 10/2013 | Paraskeva et al. | |
| 2013/0311313 A1* | 11/2013 | Laracey | G06Q 20/3278 705/16 |
| 2013/0339188 A1* | 12/2013 | Mohamed | G06Q 20/387 705/26.41 |
| 2014/0006280 A1* | 1/2014 | Scipioni | G06Q 20/42 705/44 |
| 2014/0019358 A1* | 1/2014 | Priebatsch | G06Q 20/3274 705/44 |
| 2014/0025581 A1 | 1/2014 | Calman | |
| 2014/0025958 A1 | 1/2014 | Calman | |
| 2014/0032419 A1 | 1/2014 | Anderson et al. | |
| 2014/0040133 A1* | 2/2014 | Lee | G06Q 20/40 705/44 |
| 2014/0040148 A1 | 2/2014 | Ozvat et al. | |
| 2014/0058951 A1* | 2/2014 | Kuppuswamy | G06Q 20/382 705/67 |
| 2014/0067677 A1 | 3/2014 | Ali | |
| 2014/0074637 A1 | 3/2014 | Hammad | |
| 2014/0074701 A1 | 3/2014 | Kingston | |
| 2014/0081838 A1* | 3/2014 | Calman | G06Q 20/425 705/39 |
| 2014/0108263 A1* | 4/2014 | Ortiz | G06Q 20/36 705/44 |
| 2014/0108785 A1* | 4/2014 | Lindteigen | H04L 9/0861 713/156 |
| 2014/0164243 A1 | 6/2014 | Aabye et al. | |
| 2014/0278894 A1* | 9/2014 | Toumayan | G06Q 30/0227 705/14.28 |
| 2014/0279552 A1* | 9/2014 | Ortiz | G06Q 20/3223 705/65 |
| 2014/0344153 A1* | 11/2014 | Raj | G06Q 20/385 705/44 |
| 2015/0012428 A1 | 1/2015 | Gray | |
| 2015/0032627 A1 | 1/2015 | Dill et al. | |
| 2015/0046330 A1 | 2/2015 | Hanafi | |
| 2015/0052064 A1 | 2/2015 | Karpenko et al. | |
| 2015/0058191 A1 | 2/2015 | Khan | |
| 2015/0100495 A1* | 4/2015 | Salama | G06Q 20/10 705/65 |
| 2015/0112870 A1 | 4/2015 | Nagasundaram | |
| 2015/0112871 A1 | 4/2015 | Kumnick | |
| 2015/0120472 A1 | 4/2015 | Aabye et al. | |
| 2015/0186871 A1 | 7/2015 | Laracey | |
| 2015/0213435 A1* | 7/2015 | Douglas | G06Q 20/425 705/64 |
| 2015/0235212 A1* | 8/2015 | Ortiz | G06Q 20/322 705/44 |
| 2015/0254635 A1* | 9/2015 | Bondesen | G06Q 20/36 705/41 |
| 2015/0254643 A1* | 9/2015 | Bondesen | G06Q 20/354 705/41 |
| 2015/0254655 A1* | 9/2015 | Bondesen | G06Q 20/3821 705/72 |
| 2015/0262170 A1* | 9/2015 | Bouda | G06F 21/44 705/67 |
| 2015/0262180 A1* | 9/2015 | Hambleton | G06Q 20/3829 705/44 |
| 2015/0332246 A1 | 11/2015 | Lafeer | |
| 2015/0332264 A1 | 11/2015 | Bondesen | |
| 2016/0019536 A1* | 1/2016 | Ortiz | G06Q 20/36 705/67 |
| 2016/0071094 A1 | 3/2016 | Krishnaiah | |
| 2016/0073263 A1* | 3/2016 | Wolosewicz | H04W 4/80 726/4 |
| 2016/0086166 A1* | 3/2016 | Pomeroy | G06Q 20/3674 705/40 |
| 2016/0104155 A1* | 4/2016 | Mcgaugh | G06Q 20/20 705/65 |
| 2016/0189291 A1 | 6/2016 | Nair | |
| 2016/0210626 A1* | 7/2016 | Ortiz | G06Q 20/023 |
| 2016/0224977 A1 | 8/2016 | Sabba | |
| 2016/0358172 A1 | 12/2016 | Ziat | |
| 2016/0371668 A1* | 12/2016 | Priebatsch | G06Q 20/348 |
| 2017/0017958 A1* | 1/2017 | Scott | G06Q 20/40 |
| 2017/0161733 A1 | 6/2017 | Koletsky | |
| 2017/0249622 A1* | 8/2017 | Ortiz | G06Q 20/351 |
| 2017/0270524 A1* | 9/2017 | Kim | G06Q 20/356 |
| 2017/0323283 A1 | 11/2017 | Todasco | |
| 2018/0137498 A1* | 5/2018 | Kim | G06Q 20/3278 |
| 2018/0225660 A1 | 8/2018 | Chapman | |
| 2019/0156326 A1* | 5/2019 | Todasco | H04W 4/80 |

FOREIGN PATENT DOCUMENTS

| | | | |
|---|---|---|---|
| CA | 2858203 | | 6/2013 |
| CA | 2830260 | | 4/2014 |
| CA | 2890335 | | 5/2014 |
| CN | 101071490 | A | 11/2007 |
| CN | 101226616 | A | 7/2008 |
| CN | 103679443 | A | 3/2014 |
| EP | 1843277 | | 10/2007 |
| EP | 2048594 | A1 | 4/2009 |
| EP | 2365469 | A1 | 9/2011 |
| EP | 2145399 | B1 | 7/2012 |
| EP | 2587432 | A1 * | 5/2013 ......... G06Q 20/1085 |
| WO | WO-0203226 | A1 * | 1/2002 ............. G06Q 20/10 |
| WO | 2002048846 | | 6/2002 |
| WO | 2007122224 | A1 | 1/2007 |
| WO | 2009001020 | | 12/2008 |
| WO | 2010015734 | A1 | 2/2010 |
| WO | 2012021864 | A2 | 2/2012 |
| WO | 2012158419 | A1 | 11/2012 |
| WO | 2013003372 | A1 | 1/2013 |
| WO | 2013072613 | A1 | 5/2013 |
| WO | 2014049136 | A1 | 4/2014 |
| WO | 2015025282 | A2 | 2/2015 |

OTHER PUBLICATIONS

Chen et al.; NFC Mobile Transactions and Authentication based on GSM Network, Second Internation Workshop on Near Field Communication; pp. 83-89 IEE Computer Society.

(56) References Cited

OTHER PUBLICATIONS

Mantoro et al.; Online Payment Procedure Involving Mobile Phone Network Infrastructure and Devices; Dept of Computer Science, University Malaysia.
Tang et al.; A Mobile Identity Authentication Scheme of E-Commerce Based on Java-SIM Card, V2-114 to V2-118 School of Electronics Engineering, Beijing University.
USCIS Form I-9 "Instructions for Employment Eligibility Verification, 9 pages, Jan. 31, 2014, including p. 9 listing Lists of Acceptable Document" used to establish identity and employment authorization.
"First Time Applicants", Department of State, retrieved Feb. 12, 2015, 4 pages citing documents needed for applying for a passport.
International Search Report dated Jan. 19, 2016 in application No. PCT/CA2015/00532.
Written Opinion of International Search Authority dated Jan. 19, 2016 in application No. PCT/CA2015/000532.
International Search Report dated Jul. 6, 2010 for Application No. PCT/AU2010/000546.
Office Action dated Aug. 6, 2014 in U.S. Appl. No. 14/287,134.
Office Action dated Oct. 22, 2015 in U.S. Appl. No. 14/287,134.
Office Action dated Feb. 19, 2015 in U.S. Appl. No. 14/287,134.
Office Action dated Oct. 15, 2014 in U.S. Appl. No. 14/287,134.
EESR mailed May 7, 2018 in EP Application No. 15846067.5.
EESR mailed Jan. 24, 2018 in EP Application No. 15848487.3.
EESR mailed Jul. 3, 2018 in EP Application No. 16739695.1.
International Search Report and Written Opinion dated Jan. 7, 2016 in Application No. PCT/CA2015/000519.
International Preliminary Report on Patentability dated Apr. 4, 2017 in Application No. PCT/CA2015/000519.
Office Action dated Aug. 3, 2016 in U.S. Appl. No. 14/142,072.
Office Action dated Aug. 27, 2014 in U.S. Appl. No. 14/056,440.
International Search Report and Written Opinion dated May 2, 2016 in Application No. PCT/CA2016/000014.
International Preliminary Report on Patentability dated Jul. 25, 2017 in Application No. PCT/CA2016/000014.
International Search Report and Written Opinion dated Oct. 14, 2016 in Application No. PCT/CA2016/000186.
International Preliminary Report on Patentability dated Jan. 2, 2018 in Application No. PCT/CA2016/000186.
International Search Report and Written Opinion dated Jun. 23, 2017 in Application No. PCT/CA2017/000050.
International Search Report and Written Opinion dated Oct. 12, 2017 in Application No. PCT/CA2017/000173.
International Search Report and Written Opinion dated Apr. 27, 2018 in Application No. PCT/CA2018/000017.
Office Action dated Feb. 5, 2018 in U.S. Appl. No. 14/705,477.
White, Ron, How Computers Work, Oct. 15, 2003, Paul Boger, Illustrated by Timothy Edward Downs, 7th Edition (Year: 2003).
Non-Final Office Action dated Feb. 14, 2019 in U.S. Appl. No. 14/869,186.
Non-Final Office Action dated Feb. 5, 2019 in U.S. Appl. No. 15/201,428.
Extended European Search Report dated Feb. 14, 2019 in EP Application No. 16816879.7.
Non-Final Office Action dated Apr. 15, 2019 in U.S. Appl. No. 14/705,477.
Final Office Action dated Aug. 23, 2018 in U.S. Appl. No. 14/705,477.
Non-Final Office Action dated Oct. 18, 2018 in U.S. Appl. No. 15/000,685.
Final Office Action dated Nov. 18, 2019 in U.S. Appl. No. 14/705,477.
Non-Final Office Action dated Nov. 12, 2019 in U.S. Appl. No. 15/884,847.
Non-Final Office Action dated Dec. 6, 2019 in U.S. Appl. No. 15/648,942.
Final Office Action dated Dec. 26, 2019 in U.S. Appl. No. 14/869,186.
Final Office Action dated Jan. 24, 2020 in U.S. Appl. No. 15/453,193.
Non-Final Office Action dated Jan. 29, 2020 in U.S. Appl. No. 15/201,428.
Non-Final Office Action dated Feb. 3, 2020 in U.S. Appl. No. 16/007,955.
Examination Report dated Feb. 11, 2020 in EP 15848487.3.
Notice of Allowance dated Mar. 12, 2020 in U.S. Appl. No. 15/414,065.
Final Office Action dated Jul. 3, 2019 in U.S. Appl. No. 15/000,685.
Non-Final Office Action dated Jul. 11, 2019 in U.S. Appl. No. 15/453,193.
Non-Final Office Action dated Jul. 24, 2019 in U.S. Appl. No. 15/414,065.
Extended European Search Report dated Sep. 20, 2019 in EP Application No. 17762362.6.
Final Office Action dated Sep. 18, 2019 in U.S. Appl. No. 15/201,428.
Office Action dated Mar. 26, 2020 issued in CN 201580064986.1.
Office Action dated Mar. 26, 2020 issued in CN 201580067059.5.
Office Action dated Mar. 12, 2020 issued in CN 201680016674.8.
Office Action dated Jun. 3, 2020 issued in U.S. Appl. No. 14/869,186.
Office Action dated Jun. 10, 2020 issued in U.S. Appl. No. 15/000,685.
Knott, What is Private Key Encryption, Koolspan, Mar. 6, 2014 retrieved from https://web.archive.org/web/20140306101755/http://www.koolspan.com/blog/private-key-encryption/ (Year: 2014).
Examination Report dated May 19, 2020 issued in EP 15846067.5.
Office Action dated Nov. 16, 2020 issued in AU 2016208989.
Office Action dated Dec. 3, 2020 issued in CN 201580064986.1.
Office Action dated Nov. 30, 2020 issued in CN 201580067059.5.
Office Action dated Jan. 13, 2021 issued in U.S. Appl. No. 14/869,186.
Office Action dated Jan. 26, 2021 issued in EP 16739695.1.
Office Action dated Jan. 26, 2021 issued in U.S. Appl. No. 15/453,193.
Notice of Allowance dated Mar. 30, 2021 issued in CA 2830260.
Notice of Allowance dated Mar. 25, 2021 issued in U.S. Appl. No. 15/201,428.
Notice of Allowance dated Mar. 24, 2021 issued in U.S. Appl. No. 15/000,685.
Office Action dated Jul. 20, 2020 issued in U.S. Appl. No. 15/648,942.
Office Action dated Jul. 13, 2020 issued in U.S. Appl. No. 16/007,955.
Notice of Allowance dated Jun. 23, 2020 issued in U.S. Appl. No. 14/705,477.
Office Action dated Jul. 6, 2020 issued in EP 17762362.6.
Office Action dated Jul. 2, 2020 issued in U.S. Appl. No. 15/201,428.
Office Action dated Jul. 6, 2020 issued in U.S. Appl. No. 15/884,847.
Office Action dated Oct. 8, 2020 issued in U.S. Appl. No. 15/453,193.
Verified by Visa Acquirer and Merchant Implementation Guide U.S. Region, May 2011, Visa, 114 pages (Year: 2011).
Visa 3-D Secure vs. MasterCard SPA, Gpayments Pty Ltd, Mar. 1, 2002, 37 pages (Year: 2002).
Office Action dated May 19, 2020 issued in AU 2015330644.
Office Action dated Jun. 3, 2020 issued in AU 2015327722.
Office Action dated Nov. 25, 2020 issued in CN 201680016674.8.
Office Action dated Apr. 13, 2021 issued in CN 201580064986.1.
Office Action dated Apr. 14, 2021 issued in CN 201580067059.5.
Office Action dated May 25, 2021 issued in U.S. Appl. No. 16/007,955.
Office Action dated Jun. 9, 2021 issued in EP 15848487.3.
Office Action dated Apr. 12, 2021 issued in AU 2016287789.
Office Action dated May 18, 2021 issued in AU 2015330644.
Office Action dated Apr. 16, 2021 issued in AU 2015330644.
Office Action dated Apr. 30, 2021 issued in AU 2015327722.
Office Action dated May 4, 2021 issued in EP 16816879.7.
Notice of Allowance dated May 8, 2021 issued in CN 201680016674.8.
Office Action dated Apr. 21, 2021 issued in U.S. Appl. No. 15/884,847.
Summons to Oral Proceedings dated Jul. 1, 2021 issued in EP 17762362.6.
Office Action dated Jun. 30, 2021 issued in CN 201780028338.X.
Notice of Allowance dated Aug. 19, 2021 issued in U.S. Appl. No. 15/453,193.
Summons to Oral Proceedings dated Dec. 14, 2021 issued in EP 15846067.5.
Office Action dated Aug. 30, 2021 issued in U.S. Appl. No. 15/648,942.
Office Action dated Oct. 25, 2021 issued in CA 2963287.
Office Action dated Oct. 5, 2021 issued in CA 2961916.
Office Action dated Oct. 13, 2021 issued in U.S. Appl. No. 15/884,847.

(56) References Cited

OTHER PUBLICATIONS

Office Action dated Nov. 29, 2021 issued in CN 201580067059.5.
Office Action dated Dec. 27, 2021 issued in U.S. Appl. No. 14/869,186.
Notice of Allowance dated Nov. 15, 2021 issued in AU 2016208989.
Notice of Allowance dated Feb. 7, 2022 issued in U.S. Appl. No. 16/007,955.
Balan, R.K. et al., "The Digital Wallet: Opportunities and Prototypes", in Computer, vol. 42, No. 4, pp. 100-102, Apr. 2009, doi: 10.1109/MC.2009.134 (Year: 2009).
Office Action dated Jan. 20, 2022 issued in AU 2017231106.
Office Action dated Mar. 21, 2022 issued in U.S. Appl. No. 15/884,847.
Office Action dated Mar. 4, 2022 issued in U.S. Appl. No. 15/648,942.
Office Action dated Mar. 1, 2022 issued in CA 2974151.
Office Action dated Jun. 13, 2022 issued in U.S. Appl. No. 17/352,174.
Office Action dated Mar. 2, 2022 issued in CN 201780028338.X.
Office Action dated Jun. 2, 2022 issued in U.S. Appl. No. 14/869,186.
Office Action dated Jun. 17, 2022 issued in U.S. Appl. No. 15/648,942.
De, P. et al., Towards an interoperable mobile wallet service, 2013 10th International Conference and Expo on Emerging Technologies for a Smarter World (CEWIT), 2013, pp. 1-6, doi: 10.1109/CEWIT.2013.6713767.
Office Action dated Mar. 14, 2023 issued in U.S. Appl. No. 14/869,186.
Notice of allowance dated Feb. 27, 2023 issued in U.S. Appl. No. 17/389,984.
Notice of allowance dated Feb. 15, 2023 issued in U.S. Appl. No. 17/387,711.
Ex Parte Quayle Action dated Mar. 23, 2023 issued in U.S. Appl. No. 17/561,638.
Office Action dated Mar. 9, 2023 issued in AU 2022201325.
Office Action dated Jan. 31, 2023 issued in KR 10-2018-7003235.
Office Action dated Dec. 15, 2022 issued in U.S. Appl. No. 17/352,174.
Notice of allowance dated Dec. 29, 2022 issued in U.S. Appl. No. 17/080,197.
Lampropoulos et al. "Identity Management Directions in Future Internet", IEEE Communications Magazine, Dec. 2011, pp. 74-83 (Year: 2011).
Notice of acceptance dated Dec. 22, 2023 issued in AU 2017231106.
European Extended Search Report dated Jan. 19, 2023 issued in EP 22187813.5.
Office Action dated Oct. 27, 2022 issued in CA 2991073.
Notice of allowance dated Nov. 3, 2022 issued in U.S. Appl. No. 15/648,942.
Office Action dated Nov. 8, 2022 issued in U.S. Appl. No. 15/884,847.
European Extended Search Report dated Oct. 21, 2022 issued in EP 22173329.8.
Office Action dated Sep. 14, 2022 issued in CA 2963287.
Office Action dated Sep. 21, 2022 issued in U.S. Appl. No. 14/869,186.
Office Action dated Sep. 2, 2022 issued in CN 201780028338.X.
Office Action dated Sep. 2, 2022 issued in CA 3126471.
Office Action dated Jul. 14, 2022 issued in CA 2961916.
Office Action dated Aug. 2, 2022 issued in EP 16739695.1.
Office Action dated Aug. 2, 2022 issued in AU 2021203623.
Office Action dated Jul. 26, 2022 issued in AU 2021203226.
Office Action dated Aug. 8, 2023 issued in CA Patent Application No. 2,963,287.
Office Action dated Jul. 24, 2023 issued in AU 2021203623.
Office Action dated Jun. 8, 2023 issued in AU 2022202404.
Office Action dated May 17, 2023 issued in CA 3,017,026.
Office Action dated Jul. 20, 2023 issued in CA 2,991,073.
Notice of Allowance dated Sep. 13, 2023 issued in CA 3,126,471.
Office Action dated Aug. 23, 2023 issued in CA 3,030,440.
Notice of Acceptance dated Nov. 1, 2023 issued in AU2022201325.

* cited by examiner

SYSTEMS FOR PROCESSING ELECTRONIC TRANSACTIONS

CROSS-REFERENCE TO RELATED APPLICATIONS

This application claims all benefit, including priority, of U.S. Provisional Patent Application Ser. No. 62/062,467, filed 10 Oct. 2014 and entitled SYSTEM AND METHOD FOR ELECTRONIC PAYMENT, the entire contents of which are incorporated herein by this reference.

FIELD OF THE INVENTION

The present disclosure relates generally to systems, methods, and machine-interpretable programming and/or other instruction products for the secure processing of data. In particular, the disclosure relates to the secure generation, processing, manipulation, storage, and administration of electronic data useful in the processing of payments and other electronic transactions.

Aspects of the generation, processing, manipulation, storage, and administration of data disclosed herein may be subject to regulation by governmental and other agencies. The disclosure herein is made solely in terms of logical, economic, and physical communications possibilities, without regard to statutory, regulatory, or other legal considerations. Nothing herein is intended as a statement or representation that any system, method or process proposed or discussed herein, or the use thereof, does or does not comply with any statute, law, regulation, or other legal requirement in any jurisdiction; nor should it be taken or construed as doing so.

INTRODUCTION

Electronic payment schemes utilize various techniques and methodologies to reduce risks association with counterfeiting and other forms of fraud, while providing convenient and/or otherwise advantageous forms of payment.

Such payment schemes may be employed in the execution of transactions involving the transfer of any type of value, including for example debit transactions; credit transactions; transactions involving virtual currency; coupons; gift cards, loyalty, discount, and other rewards programs, etc., and may be implemented through the use of various forms and components of networked systems, including for example various forms of backend payment-processing servers, point-of-sale terminals, and/or account administration systems operated by financial institutions, in addition to mobile and/or other networked systems used by purchasers and other users.

Electronic payment schemes may adhere to electronic payment standards. An example electronic payment standard is the Europay™, MasterCard™ and Visa™ (EMV) standard, which enables interoperation of integrated circuit cards (chip cards) with various systems.

Security is an important consideration in electronic payment schemes. The EMV standard provides a set of rules and procedures that improve security against counterfeiting and fraudulent activities through the use of technologies such as encryption, processing restrictions, multi-factor authentication, etc.

However, the requirement for protection against fraudulent transactions co-exists with the desirability of efficiency, convenience, and other considerations in conducting transactions. Various technologies may be used to obtain and/or otherwise collect data when generating a request to authorize a transaction, with varying effects on such considerations.

For example, such technologies may include the use of contact chips, e.g., in accordance with the ISO 7816 standard. According to this standard, data elements read from an EMV contact chip card may be used to initiate the financial transaction. The data, including for example cardholder verification results, may allow a financial institution to verify that a proposed transaction in fact originated with, or through, a genuine bank-issued chip card, and thereby allow authorization to be completed with a higher degree of confidence than through conventional means.

Other types of technology may include the use of contactless chips, e.g., in accordance with the ISO 14443 standard. According to this standard, data elements read from an EMV contactless chip card may be used to initiate a financial transaction.

A potential challenge associated with conducting electronic payment transactions may be the need for backwards compatibility with existing technology. A wide variety of systems and technologies are currently in use; and existing infrastructure and systems may be slow to adapt to technological advances. As a result, there may be a wide range of different technologies in use in the market. For example, while some technologies may be based solely on Near-Field Communications (NFC) technologies, not all point-of-sale (POS) terminals and/or mobile communication devices (e.g., smart phones, tablet computers, etc.) have the ability to communicate using NFC without potentially costly upgrades.

In such and other circumstances backwards compatibility can provide significant improvements in the efficiency and palatability of systems upgrades.

Additional limitations may be associated with the use of NFC technologies in implementing POS terminals and/or mobile communications devices. For example, such devices may be configured based on the specifications of individual issuers (e.g., bank) and/or payment schemes (e.g., MasterCard® or Visa®); and where it is even possible to modify the configurations of such devices, it may be necessary to do so repeatedly, in order to to communicate with each new desired issuer, payment scheme, etc. For example, where an NFC antenna is tuned the specifications of a first issuer at a POS terminal, it may be necessary to turn the antenna off to enable processing of a transaction from another issuer.

Further, some NFC based payment processes may be configured such that only one transaction is processed at a time by a given POS or merchant transaction processing system; and transactions may need to be processed in a particular order. This can cause unnecessary and undesirable delays where, for example, customers must form lines in order to complete purchase transactions.

Accordingly, the ability to receive and/or process a high volume of transactions may be impacted, which may result in commercial disadvantages for retailers. Further, there may be a number of different technologies available at a given time and a flexible solution may be required to reach a wide number of users whose mobile devices have heterogeneous functionality.

Delivery of payment information from purchaser devices and/or payment information/processing platforms (such as POS terminals) to payment networks (such as back-end payment or transaction processing systems) is a critical process that may benefit from flexible and secure solutions that may be interoperable across a range of different technologies.

Another challenge that may exist with conventional solutions is the difficulty in integrating other types of information into a payment transaction. For example, a purchaser or other user may be subscribed to various loyalty programs, collecting various coupons, etc., and may benefit from solution(s) wherein a transaction processor automatically applies associations and relationships between the user and/or his or her purchasing device, and such programs and/or coupons.

It may be difficult and/or inconvenient for a user to carry all such information in the form of separate physical cards, and there may be lost opportunities for collecting credits in other types of programs as users may often forget to carry cards and/or it may be too inconvenient as an extra step to input the information.

Accordingly, new, improved, secure, and/or flexible solutions may be helpful for overcoming some or all of the shortfalls of solutions currently available in the market.

SUMMARY

In one aspect, there are provided a variety of computer-implemented platforms, including account administration systems, back-end and other transaction-processing systems, and various controllers, configured for use in conducting electronic payment and other electronic transactions between purchasers, lessors, and/or other acquirers or transferees of property, services, etc., and merchants. In various embodiments, such platforms include any or all of computer system(s) configured for the generation of payment and other transaction data sets, or structures, containing various type(s) of payment data; mobile communication device(s) operable by human and/or other users to communicate with such platforms and configured to interpret and use the generated data structures or sets to communicate and/or otherwise process electronic messages or signals reflecting payment and/or other instructions; and point-of-sale (POS) and/or other merchant terminal(s) or transaction processors configured for communication with such mobile device(s) and/or platform(s) to receive the same and other electronic messages, and generate requests to process various aspects of such transactions.

In a further aspect, there are provided methods, implemented by, at, or in conjunction with mobile communication devices, which may be used as transaction system controllers for conducting electronic payment and other transactions. Such methods can include, for example, submitting a payment or other transaction request to a computer system, such as a back-end or other transaction processing system, and/or a financial institution (FI) data processing system; receiving from the computer system one or more data sets, or structures, containing payment and/or other transaction data; and generating one or more electronic messages representing payment and/or other transaction instructions using the data set(s).

In a further aspect, there are provided further methods implemented by, at, or with such controllers or communication devices, for conducting electronic payment and other transactions. Such methods can, for example, include: receiving and/or interpreting data representing identifiers and/or other codes associated POS and/or other merchant transaction terminals or systems; receiving data sets which include payment and/or other transaction data, or instructions, from back-end or other transaction processing computer systems; generating electronic messages representing payment and/or other transaction instructions, and using the data sets and the identifiers associated with the merchant terminals in processing transaction requests.

In further aspects, there are provided methods, implemented at back-end and other transaction-processing computer systems, which include various forms of generating data sets containing payment and/or other transaction data and/or instructions; and transmitting such data sets to mobile communications devices and other network communication systems associated with consumers and other users.

Payment and/or other transaction data suitable for use in implementing various aspects and embodiments of the invention may include locators or other references, such as uniform resource locators (URLs) useful for accessing or otherwise identifying payment and/or transaction data stored in remote memories, or memory(ies) not immediately associated with or controlled by the requesting device(s). Methods in accordance with such aspects and embodiments may include retrieving, interpreting, and/or otherwise processing such additional transaction information using the locators.

Transaction-related data sets suitable for use in implementing various aspects and embodiments of the invention, and messages comprising or consisting thereof, may include data useful for generating visual and/or other types of human- and/or machine-readable representations of data sets or structures.

Transaction-related data structures suitable for use in implementing various aspects and embodiments of the invention may include one or more EMV-compliant data tags.

Transaction-related data structures suitable for use in implementing various aspects and embodiments of the invention may include one or more EMV-compliant and other payment data tags, or elements, comprising delimiters adapted to configure the payment elements to single or other limited numbers of use.

Transaction-related data structures suitable for use in implementing various aspects and embodiments of the invention may include one or more EMV-compliant data sets or elements, each configured or otherwise associated with one or more maximum transaction value limits.

Transaction-related data structures suitable for use in implementing various aspects and embodiments of the invention may include data representing information associated with at least one of loyalty programs; coupon, discount, and gift cards or accounts; and/or other reward programs.

Computer systems suitable for use in implementing various aspects and embodiments of the invention may be configured for the generation and updating of user profiles associated with user of mobile communications devices and other components of such systems.

In various aspects and embodiments, there are provided methods, implemented at POS and/or other merchant terminals, which can, for example, include: receiving data messages from mobile communication devices, the messages representing payment and/or other transaction-related instructions; parsing and/or otherwise interpreting the messages to extract transaction information; and generating requests to process pending transactions associated with the transaction information.

In various aspects and embodiments, reception of messages from mobile devices or other controllers by merchant and/or other transaction processing systems may include optically scanning, or otherwise implementing machine-reading processes, to interpret the messages received from the mobile devices.

In various aspects and embodiments, the invention provides methods for conducting electronic payment and/or other transactions through the use of multiple mobile communication devices or controllers. Such a method can, for example, include: submitting, by a first mobile device, a payment request to a merchant, financial institution and/or other transaction-processing computer system for a payment to be made by a second mobile device using payment data from a first user; receiving, by the second mobile device, a data structure containing payment data for the first user from the computer system; and generating, by the second mobile device, a message reflecting payment instructions to an account associated with the first user using the received data structure.

In various aspects and embodiments, the invention provides platforms, such as back-end and other transaction-processing platforms, for conducting electronic payments and other electronic transactions under the entire or partial control of such controllers. Such platforms can, for example, include: one or more utilities (i.e., applications, programs, and/or other instruction sets) for processing of transaction requests; one or more utilities for generating data elements and sets; and one or more utilities for provisioning mobile devices; wherein the one or more utilities for processing transaction requests, the one or more utilities for generating data elements and sets, and the one or more utilities for provisioning mobile devices are configured for communication and co-operation in conducting electronic payment transactions, wherein transaction requests are parsed, data elements are generated based on the parsed transaction requests, and the mobile devices are provisioned using the generated data elements, and sets thereof.

In various aspects and embodiments, the invention provides platforms, such as back-end and other transaction-processing platforms, for conducting electronic payments and other electronic transactions under the whole or partial control of such controllers. Such a platform can, for example, include: one or more non-transitory computer-readable memories storing data representing instruction sets; one or more processors for execution of such instruction sets, the instruction sets including instructions which when executed, cause the processors to: generate data structures containing payment and/or other transaction data; and transmit data structures to mobile devices associated with users.

In various aspects and embodiments, the invention provides merchant terminals for conducting electronic payment and other electronic transactions. Such merchant terminals can, for example, include: one or more non-transitory computer-readable memories storing data representing instruction sets; one or more processors for execution of the instruction sets, the instruction sets including instructions which when executed, cause the processors to: receive messages from mobile and/or other communication devices representing instructions pertaining to electronic payments and other electronic transactions; parse the messages to extract transaction information; and generate requests for processing various aspects of the transactions.

In various further aspects, the disclosure provides corresponding systems and devices, and logic structures such as machine-executable coded instruction sets for implementing any or all of such systems, devices, and methods.

It is to be understood that the various aspects and embodiments of the invention are not limited in their scope or application to the details of construction and to the arrangements of the components set forth in the following description or illustrated in the drawings. As will be appreciated by those skilled in the relevant arts, the invention is suitable for implementation in a very wide variety of embodiments, using components or parts substantial portions of which may be currently known, and others of which will doubtless hereafter be developed. It is further to be understood that the phraseology and terminology employed herein are for the purpose of description and should not be regarded as limiting.

BRIEF DESCRIPTION OF THE DRAWINGS

Various aspects and embodiments of the invention are illustrated in the accompanying drawings, which are meant to be exemplary and not limiting, and in which like references are intended to refer to like or corresponding parts.

DETAILED DESCRIPTION

Figure 1:
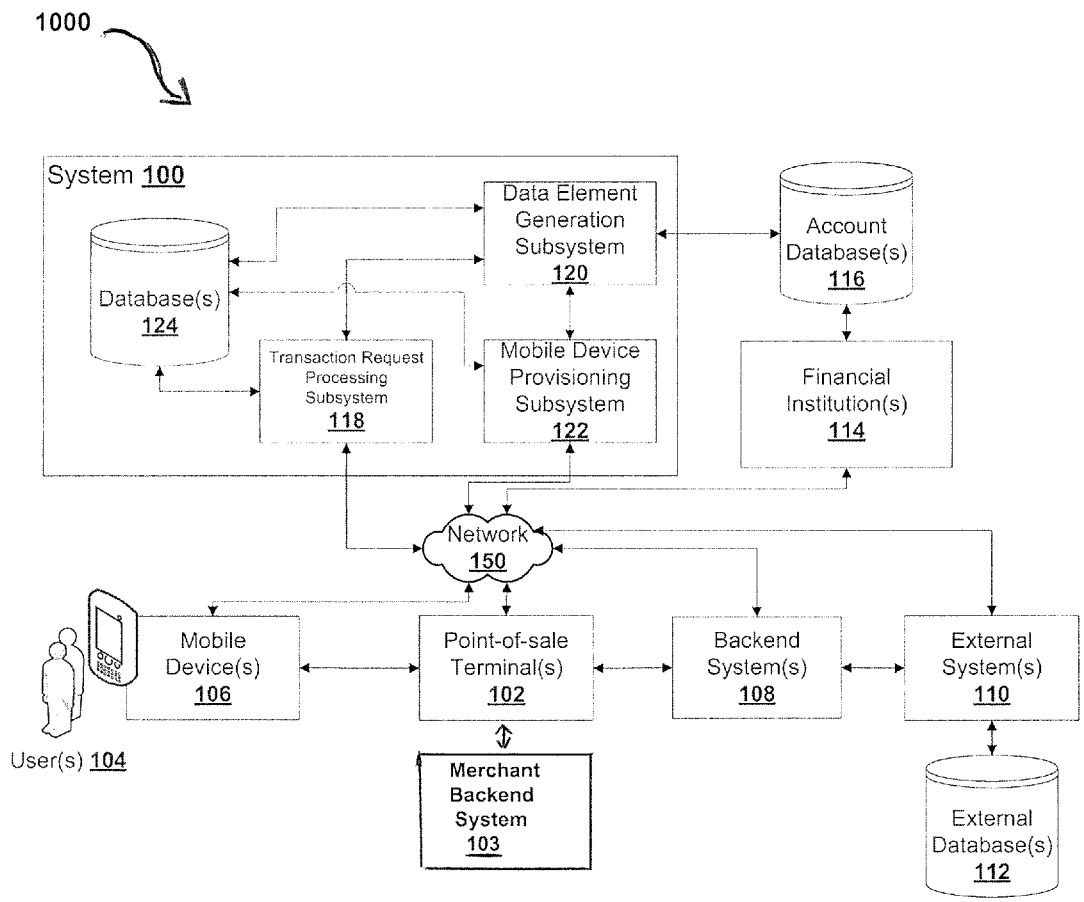
FIG. 1 is a block schematic diagram of a system for processing electronic transactions in accordance with various aspects and embodiments of the invention.

Currently-preferred embodiments of methods, systems, and apparatus according to the invention are described through reference to the drawings.

Electronic payments may be utilized to conduct payment transactions between one or more parties, and may be linked to a wide variety of further types and uses of financial data systems. In some embodiments, financial information may also be transferred through to one or more external and/or backend systems, such as those associated with various acquirers, point-of-sale (POS) and other merchant service providers, third party payment processing services, loyalty, reward, and other financial services companies, regulators and other financial institutions, etc. Electronic payment transactions may be conducted through the use of various types of funding sources or accounts, including for processes involving virtual currency, gift cards, credit cards, charge cards, debit cards, Interac™ transactions, virtual credits (e.g. airtime credits), loyalty points, rewards programs, etc., and corresponding value accounts. In some embodiments, electronic payment transactions may also be linked to other types of systems and/or accounts (e.g. payment through a credit card at certain merchants may also be associated with one or more loyalty programs administered by or otherwise associated with that merchant or other merchants or service providers). In some embodiments, electronic payment transactions may also be linked to coupons and other forms of discounts. In some embodiments, electronic payment transactions may also include refunds, void transactions, etc.

Various aspects and embodiments of the invention are suitable for use in conjunction with a wide variety of purchase, lease, rental, borrowing, transfer, and other types of transactions relating to products, services, and intangible properties. For example, such transactions may be initiated in-store, online, between individuals, etc., and may involve the use of POS terminals and/or various other types of merchant transaction devices. In some embodiments, a POS or other merchant transaction processing system may simply be represented by an image or graphically-embedded code, such as a machine-readable quick response (QR) code or a bar code; or by a radio frequency identification (RFID) or NFC tag comprising a machine-readable coded identifier which serves to adequately or uniquely identify the merchant system. Such codes may, for example be used in regards to payment information transactions where the payment information is pushed from a mobile device to a point-of-sale terminal, a checkout counter, etc.

Transactions implemented in accordance with various aspects and embodiments of the invention may be processed synchronously and/or asynchronously, in real time, near real-time, batch mode, or according to any other desired or otherwise suitable process, protocol, or mode.

Electronic payments may involve the communication of transactional and/or other financial information between one or more parties, any or all of which communication(s) may be conducted using any suitable media and/or technologies, including for example QR codes, bar codes, NFC exchanges or transmissions, Bluetooth, TCP/IP/UDP messages, extended markup language (XML) messages, SMS or other text files or protocols, database records, etc.

The communication of transactional and/or financial information may be in conformity with any of a wide variety of standards or protocols, including for example the payment cards industry (PCI) security standards, the Europay™, MasterCard™ and Visa™ (EMV) standard, the Financial Information Exchange (FIX) protocol, etc. Such standards may be used, in implementing various aspects and embodiments of the invention, in ways which allow for increased flexibility in transaction implementation, and/or to increase security, authentication, fraud protection, privacy, and other aspects of transaction processing.

In various aspects and embodiments the present disclosure provides systems, methods and non-transitory computer readable memories for electronic payments. Such memories may comprise either or both of informational data (representing account numbers and other identifiers, algorithmic operands, etc.), and instruction sets which may be read, interpreted, and executed by various forms of data processors in order to implement a wide variety of tasks disclosed or suggested herein. Various methodologies and techniques can be used to conduct electronic payments, including for example (1) the ability for payment information to be pulled from a mobile or other network communication device, and (2) the ability for payment information to be pushed from such a device (for example, to authorize future transactions or to authorize pending transactions).

The various embodiments described herein may interact with a wide variety of physical elements or components, such as physical POS terminals, mobile and other communication devices and controllers, etc.; and may interconnect with a wide variety of computer and/or electronic signal (e.g., data) processing systems incorporating various processors and/or computer readable media. There may be significant cost savings and/or commercial advantages where computerized and/or electronic implementation is used, as there may be a high volume of transactions utilizing complex authorization and/or cryptographic means to conduct transactions securely and privately.

Integration of a very wide variety of types of information (e.g. coupons, loyalty information, gift cards, promotions, and other useful information) along with data directly related to a payment transaction during a payment or other transaction process may provide significant advantages, particularly due to the establishment and use of trusted relationships (sometimes referred to as "circles of trust") as a typically desirable, pre-existing aspect of the validation and authentication of payment and other transactions.

Among the advantages provided by various aspects and embodiments of the invention are the ability to process a large volume of transactions; the ability to interoperate with mobile and other communication devices with a wide range of available technologies; the ability to automatically recognize and process beneficial information (e.g. coupons, loyalty) which may not be strictly required in order to complete a payment or other transaction.

In some embodiments, the generation and/or provision of unique payment information, including for example limited or unlimited payment authorizations, to a mobile or other communication device may be performed for each transaction. So, for example, payment information may be unique for each transaction process, and accordingly may be valid or otherwise authorized for only one transaction. Alternatively, such authorizations and information may be provided with the suitable flags or other delimiters identifying them as good for use in multiple transactions. For example, a pre-authorized payment token may be provided with a purchase value or cap, the token being good for multiple transactions, with the value or cap being decremented accordingly upon completion of each transaction, until the value is fully or sufficiently exhausted (e.g., until the value of the token falls to zero or beneath a minimum pre-defined threshold).

Payment tokens and other transactional data sets may be generated in such fashion as to adhere to any one or more desired electronic payment standards or protocols (e.g., the EMV standard). Conveniently, in some process workflows for some embodiments, such generation permits transaction processing, once payment information has been received at a POS or other merchant processing terminal, to be performed in substantially the same manner as where payment information is provided by way of conventional payment means (e.g., a conventional chip or magnetic-stripe payment card).

In some embodiments, the provision and/or generation of payment information to a mobile or other purchaser device are not contemporaneous with a transaction. For example, data elements and/or data representing authorized payment information may be provisioned to a mobile device in advance of a transaction, such that the mobile device is able to generate and/or present sufficient payment information independent of a backend system. Functionality to allow the provisioning of a mobile device independent of a transaction may be used to enable transactions where, for example, a mobile device is unable to connect to a network. In such situations, the mobile device may simply utilize information previously stored on the device to generate and/or display a suitable message (e.g., reflective of payment instructions) for transmission to a POS terminal. In some cases, such stored, pre-authorized payment information may expire after a pre-defined time period (e.g., one hour, one day, etc.). In some cases, the stored information may be used only for a pre-defined number of transactions (e.g., one transaction, or a few transactions).

Similarly, the input of codes or other identifiers to identify a POS terminal or other merchant system in order to facilitate completion of a transaction, for example in order to enable a communications exchange between a back-end payment processing system and a merchant transaction processor in establishing or conducting a push payment transaction as described herein, may also be temporally distinct from a transaction. Such functionality may be useful in a variety of circumstances, such as when the mobile device is unable to connect to a suitable network, or where batch or other parallel processing is desired, in order to balance information transfer and reduce customer waiting times in checkout lines, etc.

FIG. 1 is a block schematic diagram of a transaction processing system 1000 suitable for use in implementing electronic payments and other transactions in accordance with the disclosure herein. System 1000 may include a wide number and variety of components, some or all of which may be commonly or separately controlled, including for example any one or more data generation systems 100, such as account administration systems; financial institution systems 114; mobile communications devices or other controllers 106; POS terminals 102 and/or other merchant transaction processing systems 103, third-party transaction processing and/or adjudication systems (sometimes referred to herein as "backend" systems) 108, and a wide variety of supporting external systems 110 and databases 112, 116, etc.

A payment token generation system 100, for example, may be independent of, or may be associated, either by ownership, partnership, administrative control, contract, or other means with, one or more financial institutions 114. In some embodiments, for example, a system 100 may include one or more servers operated by a financial institution 114, and one or more databases 124. In other embodiments, an account administration or other data generation system 100 may be a system operated independently of the financial institution 114. For example, a system 100 may be implemented using one or more servers having one or more processors, operating in conjunction with one or more computer-readable storage media, configured to provide backend services, such as data processing, data storage, data backup, data hosting, among others.

The various systems, subsystems and/or databases depicted in FIG. 1 are provided as examples. So, there may be more, less, different and/or alternate systems, subsystems and/or databases, and two or more subsystems may be implemented as a single system, subsystem and/or database. Each of the systems, subsystems and/or databases may be implemented using any software, hardware, firmware, and/or other technologies, and/or any combination(s) thereof suitable for implementing the systems and process described herein, for example, as further described below with reference to FIG. 8.

Databases 112, 116 and 124, for example, may be implemented using various database technologies, such as relational databases (e.g. SQL databases), flat databases, Microsoft Excel™ spreadsheets, comma separated values, etc. If for example any of databases 112, 116 and 124 are implemented using relational database technology, the databases 112, 116 and 124 may be configured to further store relationships between various data records. Moreover, any databases 112, 116 and 124 may be implemented using various hardware or software technologies, such as solid state or hard disk drives, redundant arrays of independent disks, cloud storage, virtual storage devices, etc.

The systems, subsystems, databases, and or other components of system 1000 may be configured for communication between one another, and any means suitable for implementing the purposes described herein; for example any of a wide variety of application programming interfaces (APIs) and/or other types of communication may be utilized. Such an API may be implemented via various technologies, such as Simple Object Access Protocol (SOAP), interfaces developing through exposing functionality using programming code, representational state transfer (REST adhering programming techniques), etc.

System 1000 and any of its components may be implemented in various ways, and some embodiments may require implementation using one or more processors, which may be connected to one or more non-transitory computer readable media. In some embodiments, any or all components of a system 1000 may be implemented through the use of distributed networking resources, which, for example, may include various cloud-computer based implementations.

In some embodiments of the invention, system 1000 comprises or consists of a set of distributed computing devices connected through a communications network. An example of such a set of distributed computing devices would be what is typically known as a "cloud computing" implementation. In such a network, a plurality of connected devices operate together to provide services through the use of their shared resources.

A cloud-based implementation for conducting electronic payments may provide one or more advantages including: openness, flexibility, and extendibility; centralized or decentralized management; reliability; scalability; being optimized for computing resources; engaging variable computing resources based on demand, having an ability to aggregate information across a number of users; and ability to connect across a number of users and conduct data mining and/or other data analytics.

While embodiments and implementations of the present invention may be discussed in particular non-limiting examples with respect to use of the cloud to implement aspects of the system platform, a local server, a single remote server, a software as a service platform, or any other computing device may be used instead of the cloud.

Token generation system(s) 100 may be configured for interoperability, directly or indirectly, with POS terminals or other merchant transaction processing systems 102, backend systems 108, external systems 110, external databases 112, database 124 and/or account databases 116. System(s) 100 may be configured for communication with any number of mobile communication devices 106 through any one or more public and/or private networks 150, the mobile device 106 generally being associated with and operated by a human user 104. The one or more networks 150 may include any or all of the internet, intranets, point to point networks, wireless/wired links, public or private telephone systems and local and wide-area networks, etc. Networking technology may include any suitable technologies, such as TCP/IP, UDP, WAP, etc.

In some embodiments, database(s) 124 may be configured to store data representing information and/or transaction logic elements related to users, such as profile(s) having their corresponding account information and related or unrelated coupons, loyalty program information, etc. Such database(s) 124 may also be configured to store a set of rules and relationships, which may be applied during transactions to automatically relate or otherwise introduce or involve transactions with loyalty programs and/or coupons. For example, a fuel purchase transaction at a gas station may also trigger the crediting of the user's frequent flyer miles program.

Mobile communication device(s) or controller(s) 106 can be of any type(s) or form(s), and comprise any systems and/or components suitable for implementing, or otherwise compatible with, the purposes disclosed herein. In various embodiments, for example, a controller 106 may include one or more electronic data processors configured for interpreting and processing coded data representing mobile applications and other instruction sets that may be configured for use in communicating and/or otherwise interacting with the system 100. In some embodiments, for example, such mobile applications may also be configured for the manual and/or automated input and/or storage of other information associated with payment transactions, such as loyalty rewards information, gift cards, coupons, etc., and the mobile applications may be configured for operation based upon a user's profile, which may be stored locally or in the database 124. The user's profile may also be received and/or accessed from account databases 116. In some embodiments, account databases 116 may also store loyalty, gift card, and/or coupon information associated with an account associated with a user 104.

Mobile device(s) 106 (also referenced as 800 in FIG. 8) may be configured to present and/or interpret various types of machine-readable codes (e.g. bar codes, QR codes, RFID and/or NFC codes) using displays 808, cameras and other optical readers 835, etc., and/or NFC, RFID, and other wireless transceivers; to wirelessly, optically, and/or otherwise transmit various messages and types of messages using network interfaces 811; and to display images, notifications, prompts, interactive or other interface screens, etc. using I/O interface devices 804. Optically-interpretable, wireless, and other codes, signals, or data types may, for example be presented by a device 106 to a POS 102 as part of the process of setting up or completing the communication of payment and other transaction instructions.

In various embodiments, the mobile device/controller 106, 800 may be configured to generate codes of various types or formats, in order to facilitate processing in accordance with the disclosure. In some embodiments, the device 106 receives codes containing the various messages, in various forms, generated by various types and forms of external systems (e.g., at system 100).

Device(s) 106, 800 suitable for use in implementing various aspects and embodiments of the invention may comprise various network and other communications systems and interfaces, such as Bluetooth, RFID, NFC and other wireless, wired or wireless text messages, etc. The mobile device 106 may include various user input means, such as one or more keyboards, keypads 815, touchscreens 808, cameras or other optical interfaces 835, etc. Mobile device(s) 106 may include various sensory devices 835, such as accelerometers; gyroscopes; satellite positioning or other location sensing or determining means; fingerprint readers, retina scanners, and other biometric sensors 835; etc. Mobile device(s) 106 may also include various forms of output systems, including wireless, wireline, and optical, sonic, and tactile output devices such as vibrators. Such optical devices may, for example, include screens, lights, etc., adapted to generate and output human and/or machine-readable signals, including for example images on display screens, coded light signals, etc.

Data representing codes, instruction sets, and/or other data generated, received, or otherwise accessed by, or stored within, mobile devices 106 in accordance with the invention may be stored in any persistent, transient, or other memory (ies) and/or memory devices 801, 823, 803, 804, 806, etc. (see e.g., FIG. 8), comprised by or otherwise accessible by such device(s) 106 and compatible with the purposes disclosed herein. Such memory(ies) may, for example, include secure memory elements incorporated by the device(s) 106, SD or other removable memory cards coupled to the device(s), and/or memories residing off the device (e.g., in the 'cloud' or other remote networked location) accessible by the device by wireless or other means, etc.

It should be understood that mobile device(s) and other controller(s) 106 suitable for use in implementing the various aspects and embodiments of the invention may be of any types or forms compatible with the purposes disclosed herein. They may, for example, comprise or consist of any of a wide variety of hand-held two-way wireless paging computers, wirelessly-enabled palm-top computers, smart or other mobile telephones with data messaging capabilities, tablet computers, portable digital media players, or wirelessly enabled laptop computers, but could be any type of mobile data communication device capable of sending and receiving messages, e.g., via a network connection. These can include, for example, automobiles, bicycles; wallets, briefcases, and other accessories; smart watches, necklaces, bracelets, and other forms of jewelry or clothing; and/or any other things or devices comprising suitable data processors and communications systems Point-of-sale (POS) terminals and other merchant transaction processing systems 102, 103 may be software based, hardware based, or combination(s) of both. In some embodiments, POSs 102 may be configured to connect and/or otherwise communicate with network(s) 150. POS terminals 102 may include a wide variety of transaction-related and non-transaction-related components, including for example cash registers, and other forms of payment-receiving, holding, or processing devices. POS terminal(s) 102 may include or be coupled to back-end or other computer systems 103 located at or otherwise associated with the corresponding merchant enterprise. Such merchant computer systems 103 may, for example, be configured to access, store, and/or provide information associated with payment transactions, such as loyalty rewards information, payment card data, customer data, etc. In some embodiments, a separate POS device may be used to capture payment information, and thereafter passed to back-end merchant 103 or third party processors 102, 108, 114, etc. In some embodiments, POS terminal(s) 102 may include or otherwise access and execute software configured to integrate the POS(s) with multiple external and backend systems 110, etc., including systems associated with the storage, administration, or other processing of coupons, loyalty points, discounts, etc., to process a secure payment transaction.

POS terminal(s) 102 in accordance with the invention may be configured such that they may receive transaction information from one or more users, which may then be transmitted to backend or transaction adjudication systems 108 for processing. Such information may be transmitted to the backend systems 108 by way of network 105, and/or by way of direct link(s) interconnecting terminal(s) 102 and backend system(s) 103, 108. POS terminals 102 may be of various types, and may have differing input capabilities.

For example, some POS terminals 102 may include attached or integrated scanning devices, cameras, RFID/NFC receivers/transmitters, and/or other input means. Such input means may be used to capture various pieces of information related to transaction information, which may be embedded or otherwise included in QR codes, bar codes, RFID or NFC message, tags etc.

In some embodiments, POS terminals 102 may also be configured to receive messages in other formats and across other media, such as through Bluetooth messages, NFC messages, RFID or other wireless messages, text messages, etc., as may be transmitted by mobile devices 106 as part of payment instructions.

POS terminal(s) 102 may also be configured to receive, parse, and/or otherwise data elements, such as those related to various electronic payment standards. POS terminal(s) 102 may be configured to communicate with external systems 110 to obtain various pieces of information associated with a transaction, such as loyalty information, coupon information, advertising and/or tracking information, etc. For example, a POS terminal 102 may be configured such that the terminal may recognize that a purchaser or other user is a member of a loyalty program and associate a purchase accordingly. In some embodiments, such information may be retrieved by a POS terminal 102 from an external system 110 using location data (e.g., in a form of an URL included in a message received from a mobile device 106.

In some embodiments, merchant system(s) 102, 103 may be configured to receive information regarding a user's loyalty programs or coupons and communicate with external system(s) 110 to indicate that a transaction should be credited or debited towards a particular loyalty program or a coupon has been used. In some embodiments, merchant system(s) 102, 103 may be configured to communicate with external system(s) 110 to determine whether a particular user is associated with various loyalty programs and/or coupons, etc.

POS terminal(s) 102 may be configured for online and/or offline operation. POS terminal(s) 102 and/or other merchant transaction processing systems 103 may also be configured for continuous and/or batch processing of transactions.

Point-of-sale terminals 102 may be associated with unique individual and/or group identifiers, such as suitably-configured optical or wirelessly-readable codes. Such codes may, for example, be displayed proximate to the corresponding POS terminal(s) 102 so that a user 104 of, for example, a mobile device 106 may be able to use the device 106 to identify the POS terminal 102 and associate it with a proposed transaction. For example, such codes may be posted or displayed in prominent, conveniently-accessible locations on posters, placards, or tags. The codes may then, for example, be accessed by a user 104 and logged to the user's mobile device 106 and associated with other transaction-related data, such that the mobile device 106 may be able to push transaction information to the point-of-sale terminal 102, and/or route it independently to a third-party system 108, such as a payment processor, for processing.

In some embodiments, identification codes associated with POS terminals and/or other merchant transaction processing systems 102, 103 may be displayed in passive, machine-interpretable form, such as a QR code, bar code, and/or RFID or NFC tags, for reading by device(s) 106 and association with proposed transactions. For example, a suitably-encoded QR image may be displayed on a wall, signpost, or other convenient or appropriate location in or near a merchant premises, for easy access and reading by a user 104 using a device 106.

Third-party backend and other transaction processing systems 108 may be various systems that may be configured for the acquisition of transaction information, the aggregation of transaction information, and/or the adjudication or other processing of transactions. Such systems may, for example, adjudicate proposed transactions by confirming, by means of suitable signal communications with user devices 106, merchant devices 102, 103, and financial institution systems 100 114, that all relevant parties are satisfied with proposed transfer of value for property, etc.

In some embodiments, such backend systems 108 may be configured for interoperability in compliance with various standards (e.g. PCI compliance, EMV compliance) and/or payment schemes (e.g., Visa™, MasterCard™, Europay™, Diner's Club™, American Express™, Interac™, various virtual currencies, Bitcoin, etc.).

Backend system(s) 108 may further communicate with external systems 110 for the processing of transactions and/or association of payment transactions involving use of loyalty programs, redemption of coupons, redemption of rewards, redemption of gift cards, etc., and/or other alternative means of payment.

External systems 110 may include various systems that may be related to payment transactions, such as loyalty membership tracking systems, rewards programs, coupon databases, etc. External databases 112 may store information associated with the various programs related to the external systems 110. For example, the external systems 110 in conjunction with the external databases 112 may store information such as a frequent flyer rewards record for a user.

Financial institutions 114 may include organizations such as banks, payment card companies, etc. that may for example administer and/or otherwise control source accounts for funds used in completion of purchase and other transactions as disclosed herein, information pertaining to which may for example be stored in account databases 116, such as information regarding a user's bank accounts, debit cards and/or credit cards, and user identification, including names and personal information such as birthdates, addresses, finger, eye, and other biometric data.

In some embodiments, account database(s) 116 may include data representing one or more sets of rules, interpretable or otherwise processable by any or all of systems 100, 120, 118, 122, 114, 106, 102, 103, 108, 110, etc., which may indicate various limitations on liability, when additional authentication measures must be used (e.g. the point-of-sale terminal 102 is in a different country than the user's known residence). Such limitations on liability may vary depending on the authentication means applied by any or all of system(s) 100, user(s) 104, mobile device(s) 106, external or backend systems 108, 110, and/or POS or other merchant systems 102, 103 and the rules established for a particular payment scheme (e.g., Visa™, MasterCard™, etc.).

In some embodiments, the account databases 116 may also include data representing secondary verification information related to account holders and other users, such as two-factor authentication information, passwords, PINs, frequent locations, biometrics, etc.

System(s) 100 may include various subsystems, including for example any or all of transaction request processing subsystem(s) 118, data element generation subsystem(s) 120, and mobile drive provisioning subsystem(s) 112. The subsystems are provided as examples, the system 100 may include more, less, different and/or alternate subsystems, and various subsystems may be combined with one another.

Transaction request processing subsystem(s) 118 may be configured for receiving transaction requests from one or more device(s) 106 via network(s) 150 requesting that a mobile device be provisioned with data sets or elements that may be used in conjunction with payment transactions. Such transaction requests may be issued and/or received for various reasons, such as a user 104 requesting that a mobile device be provisioned in anticipation of a transaction, etc.

Transaction request processing subsystem(s) 118 may be configured to receive inputs from a mobile device 106 identifying a particular POS terminal or merchant backend system 102, 103, or group(s) thereof. Such inputs may include information such as a code identifying the POS or merchant systems 102, 103. Identifying information may include the location of a merchant, department of a store or other merchant premises, a particular check-out lane or area associated with the point-of-sale terminal 102, etc. For example, a transaction request processing subsystem 118 may receive data representing an identifier "TOR-GS04-10018", associated with a particular pump at a particular gas station in Toronto. The transaction request processing subsystem 118, in some embodiments, may determine which code matches with which point-of-sale terminal 102 through stored information on a database 124, for example, a stored look-up table.

Data element generation subsystem(s) 120 may be configured for the generation of data elements and/or data sets associated with users' accounts, including for example individual pre-authorized payment tokens, etc. Account information may be requested and/or received from account databases 116 and the data elements may be generated in accordance with various standards, such as EMV.

In some embodiments, the data elements and/or sets generated by subsystem 120 may represent single-use transaction tokens, limited time tokens and/or limited value tokens (e.g. up to a predetermined threshold). In some embodiments, such data elements may be generated based upon various rules as stored on account database 116. For example, there may be rules that limit the value of tokens having a two-week expiry to a certain threshold, while tokens having a one hour threshold are provided subject to a higher threshold. The rules may for example be used to manage overall risk and liability.

In some embodiments, data elements or sets generated by a subsystem 120 may include data representing tags and/or identifiers, including URLs and other call-outs or references to remotely stored data, useful for generating ISO 8583 compliant transaction messages.

The generation of data elements and/or data sets by subsystem(s) 120 may include the generation of cryptograms and/or data sets (for example, indicating issuer information, cardholder name, application expiry date, issuer country, language, transaction currency, account numbers, sequence numbers, public/private keys, amount, amount authorized, merchant category, verification information, transaction limits, etc.). The generation of the data elements may be in accordance with any suitable electronic payment standard or protocol (e.g., the EMV standard).

In some embodiments, one or more of the data elements generated by subsystems 120 may be encrypted and also include various other information related to a user's financial accounts.

Mobile device provisioning subsystem(s) 122 may be configured for assembling and formatting data elements or sets generated by subsystem(s) 120 into transaction data sets for transmission to mobile device(s) 106. For example, a mobile device provisioning subsystem 112 may embed the payment tags and/or otherwise format a payment transaction data set intended for use in an EMV-compliant transaction into a format that may be processed by a mobile device 106 for output to a display screen associated with the mobile device 106 in the form of a QR code readable by another device, such as a POS system 102, merchant backend system 103, etc., and/or by another mobile communication device 106, such as a mobile device used or controlled by another user 104. Upon being interpreted by a recipient device 102, 103, 106, etc., tags encoded in such fashion may be similar to or the same as those used in NFC contactless transactions, and a proposed transaction may be processed accordingly.

In some embodiments, mobile device provisioning subsystem(s) 122 may be configured for incorporating data representing rule sets or logic operands into transaction data sets or messages. For example, limitations on liability, transaction monetary limits, time limits for use of a payment token, associations with loyalty, rewards, discount, and other programs, etc., may be incorporated.

Transaction data sets generated by system(s) 100 may include data representing additional information, such as advertising, tracking information, loyalty program information, coupons, etc.

In some embodiments, transaction data sets and other messages generated by systems 100 may include locators or references, e.g., Uniform Resource Locators (URLs) identifying locations where such other information is stored (e.g., at an external system 110). Such locators, when relayed by a mobile device 106 to a point-of-sale terminal 102, can allow information stored at an identified location to be retrieved by the merchant system 102, 103 (e.g., by way of network 150). Conveniently, through use of such locators, information provided, maintained, or secured by independent parties may be retrieved as needed by POS or merchant systems 102, 103, e.g., by way of tailored requests. The amount of information that may be retrieved by the merchant system 102,103 may be greater than what may be provided to the system 102, 103 by a mobile device or controller 106. Further, in some cases, the merchant system 102, 103 may submit information to the identified location. For example, the the merchant system 102, 103 may submit transaction information to an external loyalty program. The locator may be unique to a particular user, to a particular merchant, or to a particular transaction. The locator may expire after a pre-defined period of time and/or number of readings/accessings.

In some embodiments, transaction messages generated at a mobile device provisioning subsystem 122 may include further locators or references that identify, for example, IP addresses where the payment tags or data sets (e.g., EMV data tags), or other information, associated with a particular transaction are stored, or to be stored (e.g., at a system 100, 114, etc). Such locators, when relayed by a mobile device 106 to a POS terminal or merchant system 102, 103, allow the payment tags to be retrieved by the point-of-sale terminal 102 (e.g., by way of network 150). In such embodiments, the generated message need not include the payment tags, thus increasing opportunities for transaction security.

Transaction data sets and other messages may be formatted into various forms or compliance with various protocols, and/or transmitted over various media, for example, using or in the form of wireless messages, text messages, Bluetooth messages, NFC messages, bar codes, QR codes, etc. In some embodiments, images of bar codes and/or QR code may be generated and displayed, and used to communicate information optically between devices; and corresponding data sets transmitted using any suitable processes and/or devices. Such messages may, for example, be wirelessly transmitted to a mobile device 106 and thereafter formatted for display as a QR code, displayed, and accessed by another device using optical reading techniques.

Database(s) 124 may be configured for storing information related to system 100 and transactions initiated or otherwise enabled thereby, such as whole or partial transaction data sets, provisioning messages, received transaction requests, transaction logs, etc.

Payment Pull Transaction Workflow

Figure 2A:
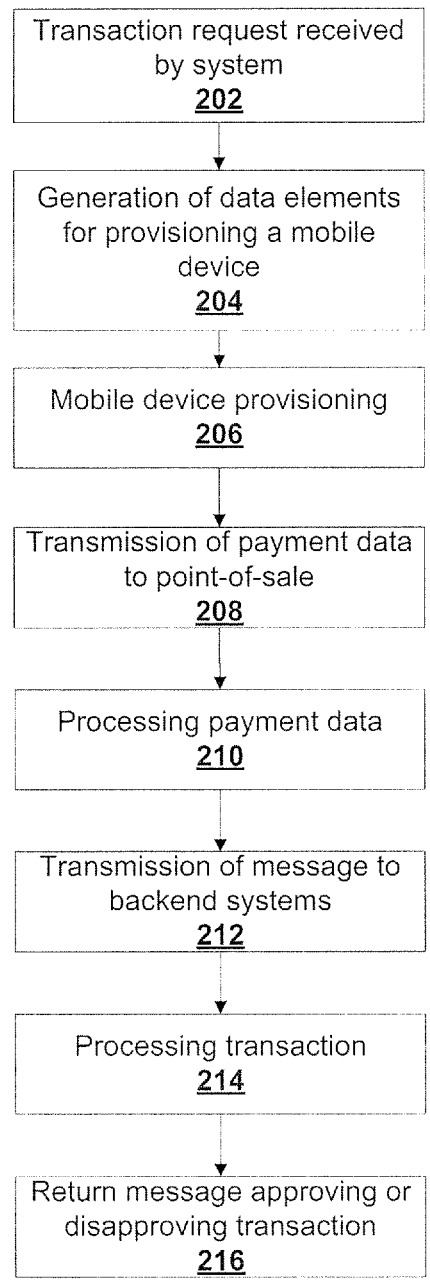
FIG. 2A is a schematic diagram of an embodiment of a process for conducting electronic transactions in accordance with various aspects of the invention.
Figure 2B:
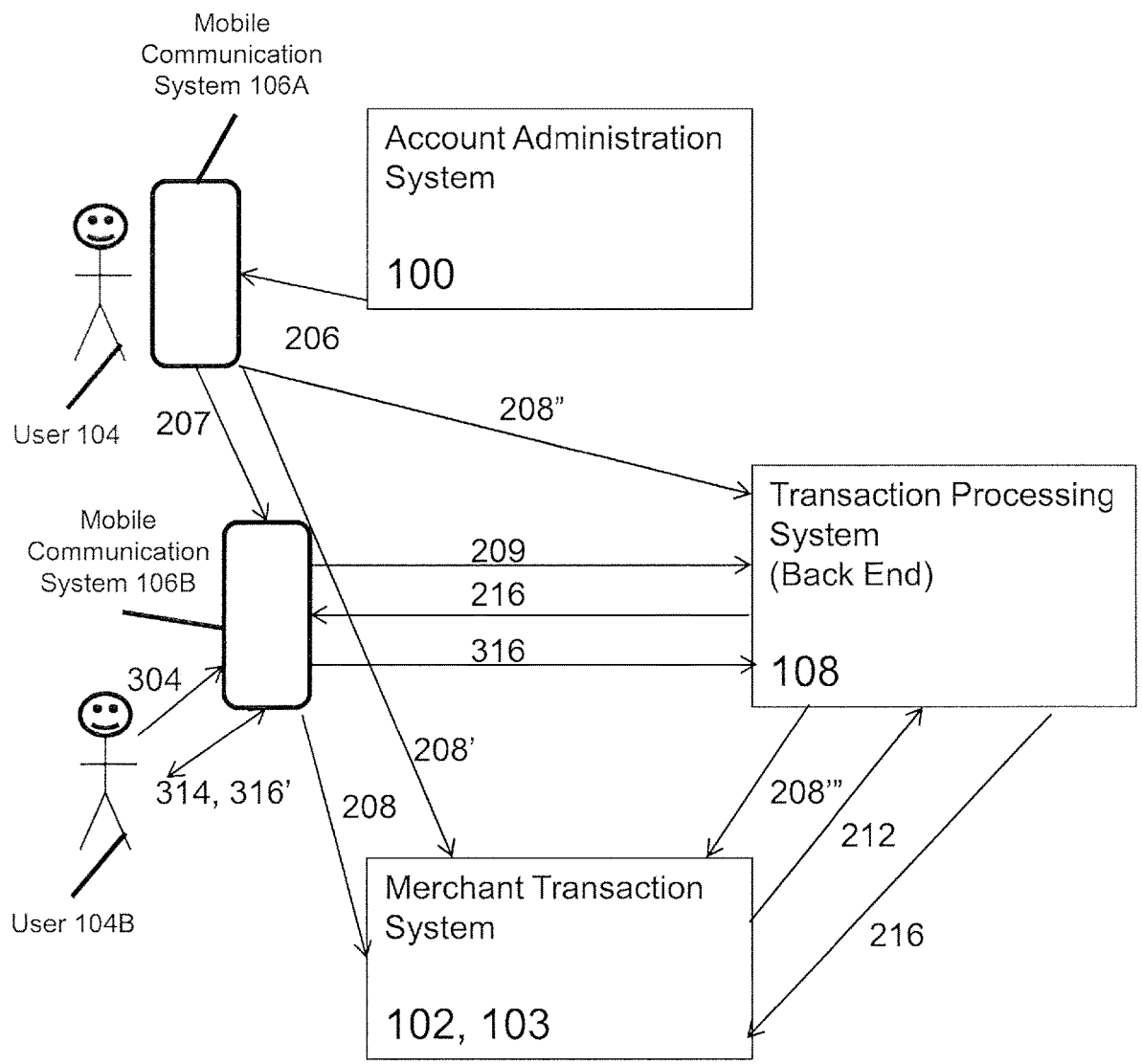
FIG. 2B is a schematic process flow diagram showing data communications flow consistent with the embodiment of FIG. 2A.

FIG. 2A is a schematic diagram of an embodiment of a process for conducting electronic transactions in accordance with various aspects of the invention, and FIG. 2B is a corresponding process flow diagram. In the embodiment shown in FIGS. 2A and 2B, payment information is pulled from a payment device, such as a mobile phone or other networked purchaser communication device 106, by a point-of-sale terminal 102. A payment flow pull transaction is a transaction wherein a customer control device 106 such as a suitably-configured mobile communication device may be provisioned, e.g., by a data generation system 100, with a transaction data set representing, for example, a pre-authorized payment token, some or all elements of which may be communicated with a POS terminal 102 in relation to a particular transaction as a payment request. The POS terminal 102, upon receiving and parsing the set of data elements, may transmit a second message to a backend system 108, and/or 103 to indicate that a payment should be processed.

Referring to FIGS. 2A and 2B, at 202 a transaction request is received by the system 100, for example from a mobile communication system 106A,B. The transaction request may relate to various types of transactions, such as a pre-authorized payment, a purchase, a rental, a refund, a cash advance, etc. The transaction request may be parsed and/or otherwise processed by, for example, the transaction request processing subsystem 118, so that, if authorized by a system 100, 114, etc., a data generation subsystem 120 is caused to generate a corresponding transaction data set and forward it to a provisioning subsystem 122 for transmission or other routing to the purchaser communication device 106 for receipt, for example, using a wireless network communication system and storage in secure, persistent memory.

In some embodiments, as shown at 207 in FIG. 2b, a first user 104 of a first communication device 106A may be able to request that a second user 104B's mobile device 106B be provisioned with data elements associated with the first user's request, so that for example a preauthorized payment token authorized on the basis of funds available through the first user's financial account may be routed to the second user's device 106. For example, a first user 104 may wish to allow a second user 104B, such as a friend, relation, associate, employee, or subordinate, to pay for a product using the first user's account. In some such embodiments, the first user may be able to indicate a transaction limit for tokens routed to the first or second user's device, and such limits may be the same or different. For example, a business user 104 may authorize a payment token to be used to complete a transaction using a second communication device 106B, with a lower maximum transaction value than a maximum transaction authorization associated with the business's account. In some further embodiments, the first user may be able to indicate that one-time data elements be generated, and/or that a payment token issued to a second user be valid only in connection with transactions initiated or completed within or before a pre-determined time. This may, for example, be accomplished by including in the transaction authorization data set one data representing or more suitable delimiter operands.

At 204, the data element generation subsystem 120 may be configured to generate a set of data elements (such as those corresponding to the EMV standard), based on information provided within the transaction request, and may use the data elements to generate a transaction data set pursuant to the request received at 202.

At 206, the system 100 may route for wireless transmission, or otherwise provision to a user's mobile device 106, the transaction data set generated at 204. In some embodiments, such provisioning may include the generation and/or transmission of a set of machine-interpretable instructions to build a corresponding transaction data set or other message at the mobile device. In some embodiments, the provisioning of a user's mobile device 106 may involve only the transmission of the data elements containing payment data, for use by a software or other-type application operable on the mobile device in building a transaction data set that is acceptable to a relevant merchant in connection with a desired transaction.

For example, such a set of instructions may cause the mobile device 106 to generate a transaction data set or other message suitable for transmission to a point-of-sale terminal (e.g. a QR code, a Bluetooth message, a text message, a NFC message) for completion of a desired transaction.

Such a set of instructions may, for example, include a set of data elements pertinent to the specific transaction request, or type of transaction request, and may be formatted into a transaction data set in various ways. In some embodiments, the set of instructions may also include instructions associated with other types or items of information, such as loyalty information, any associated programs, advertisements, tracking information, coupons, etc. In some embodiments, the set of instructions may also include one or more of the locators described above.

At 208 (and/or at 208' in FIG. 2B), the first or second user's mobile device 106, 106A, 106B can communicate the transaction data set to a POS terminal 102 or other merchant transaction processing system 103. In some embodiments, a suitable data message or signal may be wirelessly transmitted to the point-of-sale terminal by a wireless network communication system of the mobile device. For example, the mobile device may be configured to transmit a suitably configured Bluetooth message, a NFC message, a text message, etc. to the point-of-sale terminal, which may be configured to receive the message.

In some embodiments, a transaction data set stored on a device 106 may be read from the device 106 by the POS terminal or other merchant system 102, 103. For example, the mobile device 106 may be configured to display a bar code or a QR code, which the point-of-sale terminal may then read, e.g. through operation of a scanner or other image capture device 835 etc.

Alternatively, or in addition, at 208, 208''' the purchaser communication device 106 may transmit the same or another transaction data set to a third party backend server 108, such as an independent transaction processing system, which as shown at 208'''' may optionally transmit required and or desired portions thereof, with or without additional information, to the point-of-sale terminal 102.

At 210, the message containing at least the data set associated with the transaction request may be processed by the point-of-sale terminal 102 and/or other merchant system 103. This can, for example, include reading from any merchant and/or user devices 102, 103, 106 and interpreting all pertinent data relating to the proposed transaction.

At 212, the point-of-sale terminal 102 can generate the same or another transaction data set for transmission or other routing to an external, or third party, backend payment processing system 108 to confirm or otherwise validate the transaction. Such second message may include any or all data elements received from the mobile device 106, as well as data representing any additional or desired information. Again, any or all such data elements may adhere to the EMV or any other desired standard or protocol. In some embodiments, it may be particularly advantageous for POS terminal or merchant system 103 to include in the message routed at 212 some unpredictable data interpretable by system 108, as a means of ensuring the security of an apparently valid transaction request.

In some embodiments, the transaction data set forwarded by the merchant system 102, 103 may be formatted in conformance with ISO 8582 standard, or other desired standard or protocol, which may be similar to messages used in known contactless transactions. Any or all of such data may represent information such as relevant financial accounts, merchant or purchase identification systems, or they may represent substitute data representing such information, so that actual identification or verification information need not be transferred.

At 214, the external backend system 108 may process the transaction. This may, for example, involve provisionally or finally clearing the transaction with a financial institution server 110, 114 associated with a payment token or account identified by, or otherwise associated with, the user system 106's transaction request, through the use of suitably-configured signal exchanges.

At 216, a message confirming or otherwise indicating that the transaction was approved or not approved may be transmitted back to the POS/merchant terminal 102, 103, and/or to the controller 106. For example, an electronic alert may be provided to the user (e.g., through the mobile device 106) indicating whether or not the payment was approved, using the same, partially the same, or different data sets.

In some embodiments, the message indicating that the payment was approved or not approved may be transmitted to the mobile device 106.

If provided, an approval message routed to the mobile device/controller 106 may also include various other messaging, such as messaging from advertising partners, indications that a loyalty or other rewards account was credited, indications that a gift card was used, indications that a coupon or other discount was applied, indication that rewards were redeemed, etc. In some embodiments, the approval message may also include an itemized electronic receipt, which may be issued at system 100 on behalf of the merchant system 102, 103. Alternatively, the approval message may include a locator (e.g., an URL) to data representing, or otherwise useful for generating, such an electronic receipt.

For example, in a system adapted for use by or in conjunction with a merchant system 102, 103, a user of a communication device or controller 106 may be enabled to simply walk through a store and gather items the user wishes to purchase, using a bar code or other scanner or optical or wireless reading device 835 (such as an NFC and/or RFID system) to scan and record data about items suitable for use in generating an appropriate transaction request data set. The user may then initiate processes such as those described above, complete payment for the items, and prepare to leave the premises. Upon approaching an exit, the user may be enabled to show to a human or automated security system, or make otherwise make available to such a system or guard, information sufficient to evidence a validly-completed purchase transaction, so that the purchasing user may be permitted to leave the store unmolested, and without setting off alarms, with the items in her or his possession. For example, such a mobile communication device 106 can be configured to output to the same or another merchant transaction processing system 102, 103 data useable by the merchant system for confirming execution of the transaction, using at least one of the wireless data output system and the same or another network communication system.

Thus, among other improvements, the invention provides mobile, desktop, and other user communication devices or controllers 106, each such device comprising one or more wireless data communication systems 811, such NFC, RFID, and/or other wireless signal transmitters and/or receivers; one or more data processors 822; one or more user input systems, such as keyboards, keypads, touchscreens, 804, 805, 835, 815, 812, etc.; and one or more persistent memory devices 804, 802, 806, the persistent memory device(s) comprising stored data representing instructions interpretable by the at least one processor 822 and configured to cause the device to, in response to one or more command signals generated by the user input system, access data representing an authorized transaction data set, the authorized transaction data set comprising data representing at least an authorized transaction limit and one or more identifiers associated with a transaction payment account. Such data may be accessed in memory comprised by the device 106, and/or remotely in memory controlled by any one or more of systems 100, 114 through the use of suitable resource locators. The controller 106 can further use the accessed payment transaction data set to generate a tokenized transaction data set, the tokenized transaction data set comprising data representing at least an authorized transaction value and data useable by a transaction adjudication system such as a third party transaction processing system 108 for adjudicating completion of a payment transaction. Moreover, the device 106 can, using the at least one wireless data output system, output the tokenized transaction data set for use by a second mobile communication device 106 in completing the payment transaction, as for example described above and shown in FIGS. 2A and 2B.

Figure 6:
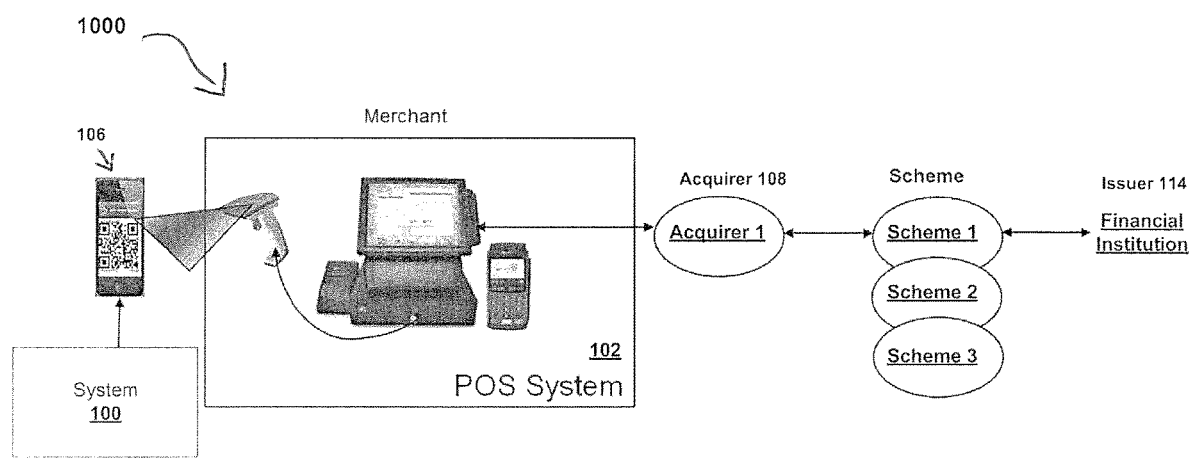
FIG. 6 is a schematic diagram illustrating possible data flow schemes between various systems and/or components during a payment flow pull transaction, according to some embodiments of the invention.
Figure 7:
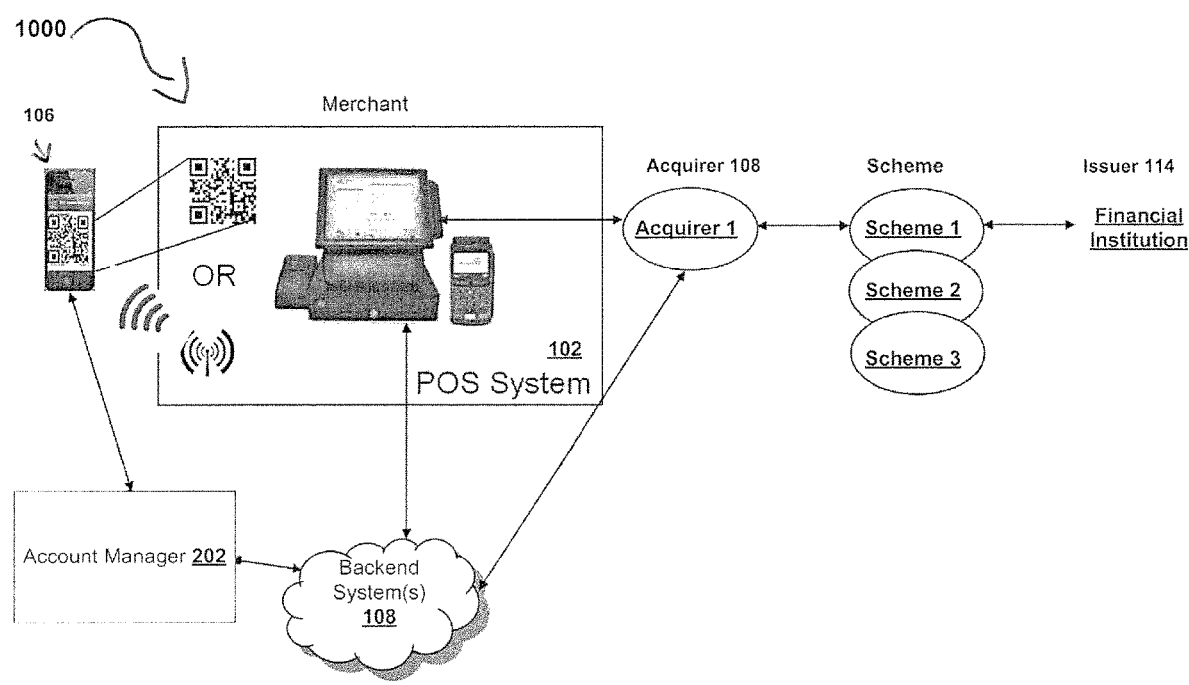
FIG. 7 is a schematic diagram illustrating the possible data flow between various systems and/or components during a payment flow push transaction, according to some embodiments.

Optional or additional features of such devices 106 can include use of wireless data output systems 811, 805, 808 to output such tokens or data sets in formats suitable for use by the second mobile communication devices in generating machine-readable optical object, such as QR and/or bar codes, or other images, comprising elements representing the tokenized transaction data sets, as shown for example in either of FIGS. 6 and 7.

Further features include incorporation, as a part of or in association with such tokenized transaction data sets, of data interpretable by the transaction adjudication system 108 as a single- or multiple-use delimiters, and/or elapsed-time or date use delimiters; and authorized transaction limits which can be the same or different for the first and second user devices 106. For example, a payment token can be subject to a lower transaction limit than the same or a similar token used by the first device 106A, when used by the second device 106B. Moreover, such differentiated transaction values may be set by an authorized user of a first device 106A, for example through use of a keyboard, touchscreen, and/or other user input system.

To facilitate processing of transactions by such first-second device combinations 106A, 106B, as described, the invention further provides for transfer of such tokens from the second devices 106B to merchant systems 102, 103 and/or adjudication systems 108. For example, in various aspects and embodiments the invention provides mobile communication devices comprising wireless data input and output systems; data processors, and input systems; the devices being configured to, in response to one or more command signals generated by the user input system, use the one wireless data input systems to receive from a such a first mobile communication device data representing a tokenized transaction data set, the tokenized transaction data set comprising data representing an authorized transaction value and data useable by a transaction adjudication system 108 for adjudicating completion of a payment transaction; and, using the at least one wireless data output system, output the same or another tokenized transaction data set for use by the transaction adjudication system 108 in adjudicating the payment transaction.

Purchaser control devices 106 can further be configured to receive the tokenized transaction data sets in formats suitable for use by the mobile communication device in generating a machine-readable optical object, such as a QR or bar code, comprising elements representing the tokenized transaction data set, and displaying such codes on output display screens for reading by merchant devices 102, 103.

Such devices can further be configured to receive, from either or both of merchant systems 102, 103 and/or transaction adjudication systems 108, data representing receipts or other confirmations of the completion of the payment transactions, and to generate confirmation data sets suitable for transfer to the (first) user devices 106A from which the tokenized payment data set was received. Thus, for example, a friend, relation, or co-worker or employee who uses a payment token transferred to his or her device 106B from a first device 106A can provide to such first device 106 a receipt or other confirmation that a requested proxy transaction has taken place. Such confirmation may also be used, as described above, to confirm for merchant security systems and/or officials that a transaction has successfully been completed, so that a purchaser or other user is now entitled to custody and control of merchandise, receipt of purchased services, etc.

Alternative Payment Pull Transaction Workflow

In some embodiments, a POS terminal 102 may be configured to directly indicate to the adjudication or transaction processing system 108 that it wishes to conduct a transaction related to a specific user 104 and/or device 106, and/or where there is a pending transaction related to user 104/device 106. For example, such a situation may arise where a point-of-sale terminal 102 is already aware of the identity of user 104, such as when a user 104 has already logged on to a website, local area network, or otherwise identified him/herself.

In such embodiments, the point-of-sale terminal 102 may transmit a payment request for a particular user 104 or device 106 to an adjudication or other backend processing system 108 directly.

The backend system 108 may be configured to transmit a request to mobile device 106 associated with the particular user 104 to obtain an approval for or validation of the transaction.

Upon receipt of an indication of whether the user 104 approves or disapproves the transaction, for example through suitably-configured requests for transaction validation communicated to the user's device 106, the mobile device 106 may be configured to transmit a message with the user's indication of approval/disapproval to backend system 108.

Upon receiving an approval of the transaction, the backend system 108 may be configured to process the transaction. Backend system 108 may obtain payment information from the mobile device 106 or from system 100. Optionally, a confirmation may be sent to the point-of-sale terminal 102 and/or the mobile device 106.

Payment Push Transaction Workflows

FIGS. 3, 4 and 5 are sample workflows including steps for conducting payment push flow transactions.

Payment push flow transaction may include transactions where, for example, a point-of-sale terminal 102 and/or other merchant device 103 may be associated with a code or other identifier, and the identifier may be acquired by a user 104 of a device and inputted into the user's device, for example by manual keyboard or touchscreen entry or by scanning a bar code, QR code, or RFID or NFC tag, as described herein. The user 104 may then use the user's mobile device 106 to provide information in regards to a transaction involving the point-of-sale terminal 102, 103 to a transaction adjudicator or other transaction processor 108, etc. Payment flow push transactions to pre-authorize future purchases and payment flow push transactions to authorize real time, contemporaneously-pending transactions are contemplated. Further types of payment flow push transactions are also enabled by the disclosure herein.

The use of payment push flows may be particularly advantageous where, for example there exist or are anticipated a large number of transactions, potentially avoiding the delays that would result from requiring users to provision a mobile device to present a code to be read by a point-of-sale terminal by, for example, waiting in a checkout line. Further, backend systems 103, 108 may be configured to receive and/or process large numbers of pushed payment transaction requests, by for example parallel and/or shared processing techniques, and the backend systems 103, 108 may have additional processing power than for example POS systems 102, the ability to engage in a larger number of connections, etc., as the backend system may not be subject to the same constraints as a point-of-sale system.

Payment Push Transaction with Notification to Merchant

Figure 3A:
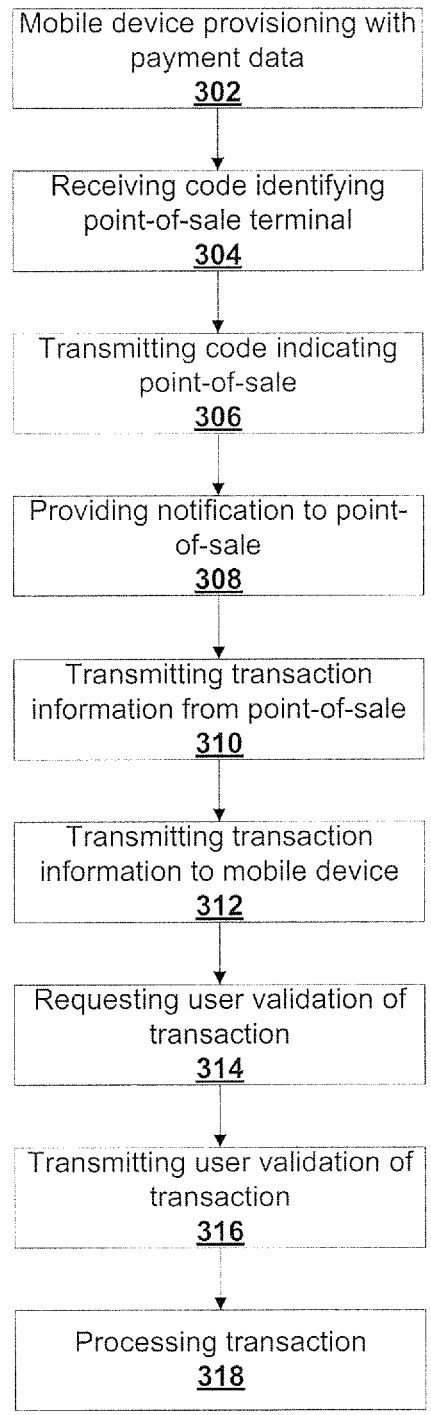
FIG. 3A is a schematic diagram of an embodiment of a process for conducting electronic transactions in accordance with various aspects of the invention.
Figure 3B:
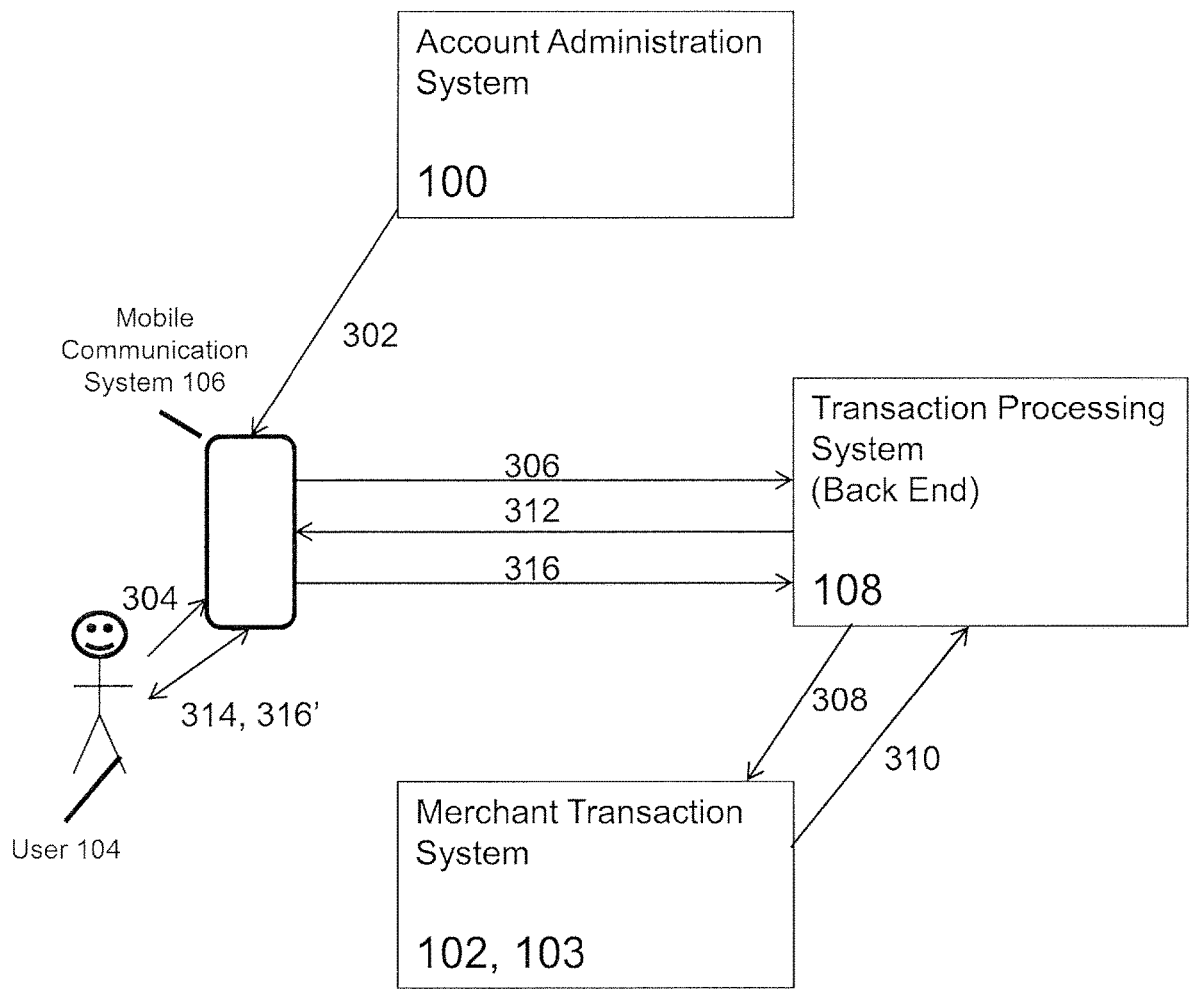
FIG. 3B is a schematic process flow diagram showing data communications flow consistent with the embodiment of FIG. 3A.

FIG. 3A is a schematic diagram of an embodiment of a process for conducting electronic transactions in accordance with various aspects of the invention. FIG. 3B is a schematic process flow diagram showing data communications flow consistent with the embodiment of FIG. 3A. In the embodiment shown in FIGS. 3A and 3B, a pending transaction at, for example, a merchant premises such as a gas station or brick-and-mortar store may have been initiated prior to the providing of information identifying a point-of-sale terminal 102 by the mobile device 106. For example, such a transaction could include a payment, such as for groceries at a grocery store check-out lane, after a customer or other user 104 has gathered and optionally scanned items the user wishes to purchase.

In various embodiments such transactions may allow for payment by the user 104 inputting or otherwise providing a code identifying the point-of-sale terminal 102 to his or her mobile device 106, and, optionally, approving a proposed transaction amount on the mobile device 106. For example, by operating a purchase application running on the mobile device 106, the user can scan all the items the user wishes to purchase, using QR, barcode, NFC, RFID, and/or other devices and processes; and thereby allow the application to build a list or other data set representing such items, and/or corresponding quantities, and prices, for presentation to and approval by either or both of merchant systems 102, 103 and/or adjudication systems 108.

At 302, a user's mobile device 106 may be provisioned for use with payment push. For example, the mobile device 106 may be provisioned by a system 100 with payment information sufficient for conducting a particular transaction in manners described above. Such information may, for example, include a data set representing a preauthorized payment token associated with a user's deposit, credit, loyalty, or rewards account administered by a bank or other financial institution 114, 110, or other back-end system 100, 108. Such provisioning may take place at the time of requested adjudication of the transaction, or at any time prior thereto.

At 304, an application stored on the mobile device 106 may be configured to and acquire or otherwise receive a code identifying the point-of-sale terminal or merchant system 102, 103 from a user 104, for example by manual keypad/touchpad input, or by RFID, NFC, QR, barcode, or other scanning, as described above. At 304, for example, the mobile device 106 may receive a code from a user 104 through inputting keystrokes on a keyboard, the code being, for example, displayed proximate to a particular check-out lane at the grocery store or other merchant premises.

At 306, the user's mobile device 106 may transmit a message, e.g., a suitably-configured transaction request date set including the provisioned payment information and the information indicating the point-of-sale terminal 102, to a transaction adjudication or other third-party backend system 108, which may be a financial institution which administers or is otherwise responsible for or in control of a deposit, credit, loyalty, or rewards account associated with the user and/or the mobile device 106, or another transaction processing system.

At 308, the backend system 108 may transmit a transaction confirmation message or data set to the identified point-of-sale terminal 102, or an associated merchant backend system 103 to provide notification that the user 104 wishes to pay or otherwise complete the requested transaction electronically, and request confirmation that the merchant system 102, 103 wishes to proceed.

At 310, the point-of-sale terminal 102 can transmit relevant transaction information or other confirmation, such as a total price, and optionally quantities and/or item identification and pricing data, along with, optionally, any desired payment instructions, such as information identifying a deposit account associated with the merchant and any other desired or requested information, taxation requirements, etc., to the backend system 108.

Optionally, at 312, the backend system 108 transmits transaction information to mobile device 106, and at 314, the mobile device 106 may request the user 104 to validate the transaction. Validation may be requested in particular circumstances, as dictated by pre-defined rules of a particular electronic payment scheme, by the merchant, or by a financial institution 114 associated with a designated payment account. For example, validation may be required if the transaction amount exceeds a pre-defined threshold, or if a given amount of time has elapsed between provisioning of the user device 106 with payment authorization data and the request for transaction provided at 306.

At 316, upon receiving user validation, the mobile device 106 may transmit a message to the backend system 108 to indicate that the transaction has been approved. In some embodiments, for example, where the value of the transaction is above a pre-defined threshold, the mobile device 106 may require verification such as the input of a PIN, a time sensitive code, a second password, etc., or biometric data such as a fingerprint or retina scan.

As noted above, the approval message may also contain other information, such as advertising or other promotional information, information indicating that a loyalty account was or is to be credited, a coupon applied, a gift card balance applied, etc.

At 318, the backend system 108 may complete processing of the transaction using the payment information received at 306.

Payment Push Transaction Without Notification to Merchant

Figure 4A:
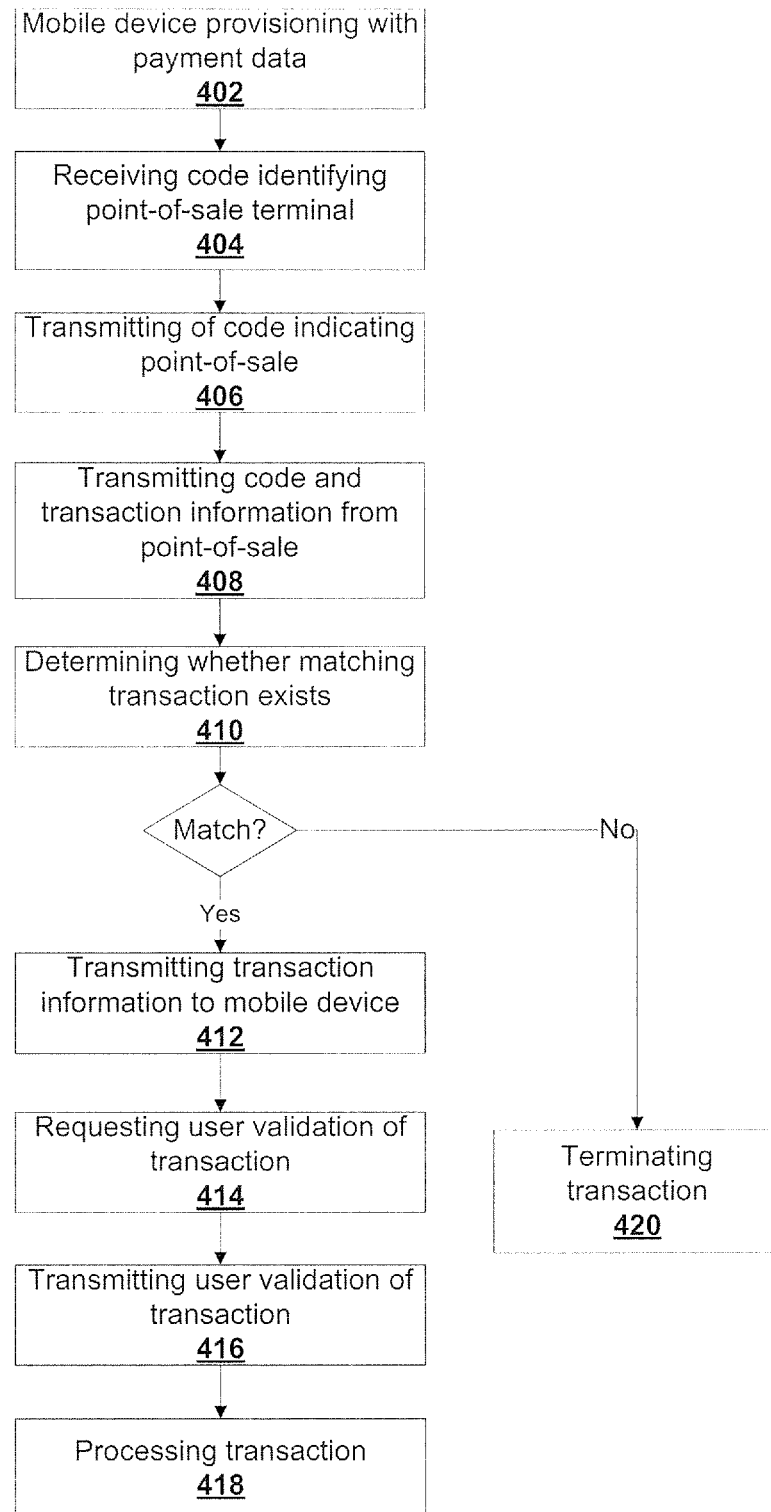
FIG. 4A is a schematic diagram of an embodiment of a process for conducting electronic transactions in accordance with various aspects of the invention.
Figure 4B:
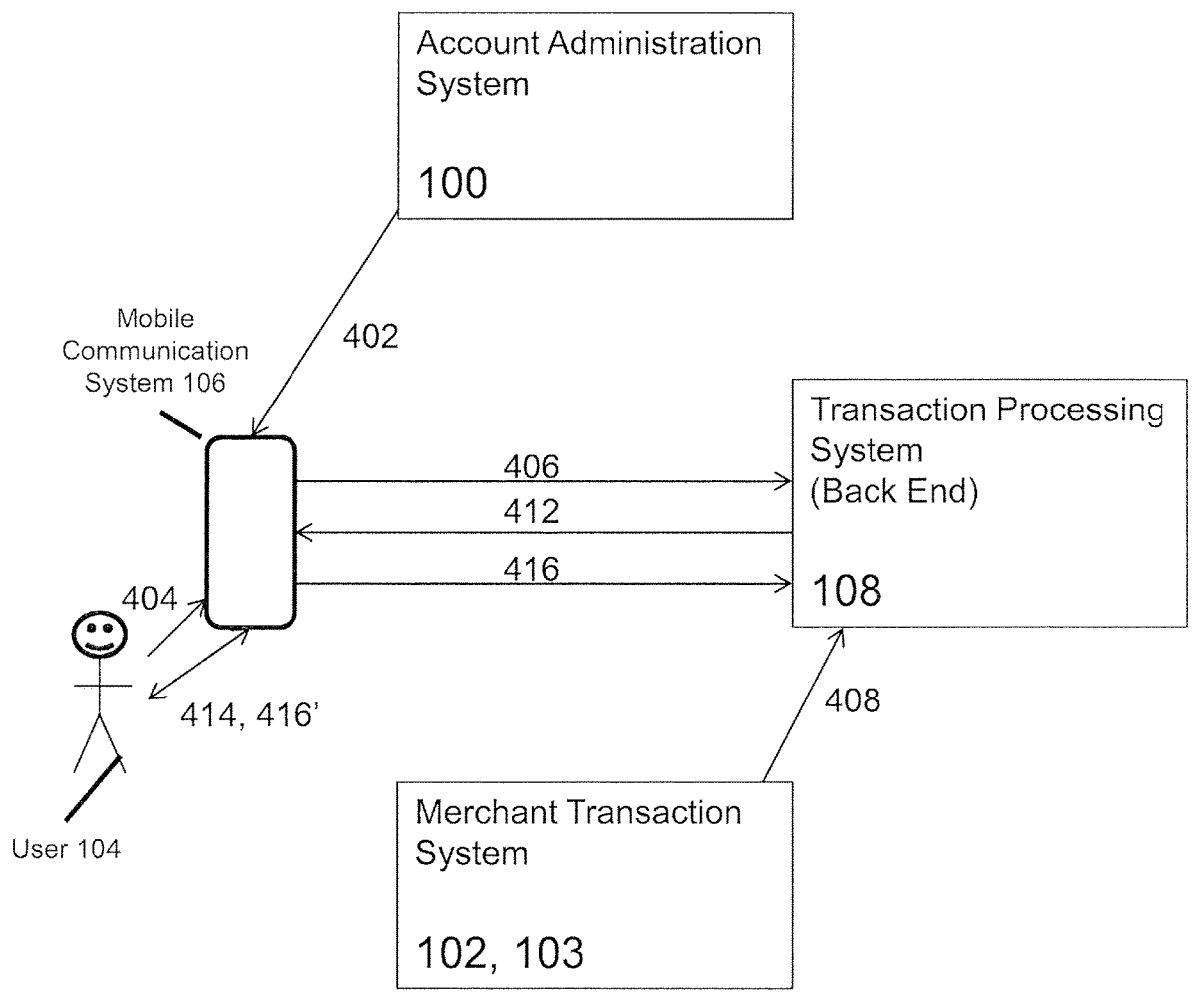
FIG. 4B is a schematic process flow diagram showing data communications flow consistent with the embodiment of FIG. 4A.

FIGS. 4A and FB illustrate a further sample workflow including steps for an embodiment where, for example, a pending transaction, or transaction value, may have been authorized and/or initiated prior to the providing of information identifying a point-of-sale terminal 102 by the mobile device 106. The workflow of FIGS. 4A and 4B is similar to the workflow of FIGS. 3A and 3B, with the exception that notification of the transaction (e.g., at 308) is not provided to the point-of-sale terminal 102, 103.

At 402, a user's mobile device 106 may be provisioned for use with payment push processes. For example, the mobile device 106 may be provisioned by system 100 with payment information for conducting a particular transaction in manners and in accordance with relative timing sequences described above. Further, an application stored on the mobile device 106 may be configured to acquire or otherwise receive a code from a user 104 and/or user device 106, as described above.

At 404, the mobile device 106 may acquire or otherwise receive a code identifying a merchant POS or backend system 102, 103 from a user 104 and/or device 106, using manual and or automated input devices and/or processes such as keyboards, QR codes, etc., as described above.

At 406, the user's mobile device 106 may transmit a message including the provisioned payment information and the information indicating the point-of-sale terminal 102 to a backend system 108.

At 408, the point-of-sale terminal 102 may transmit a message including information identifying itself and/or merchant system(s) 103 associated therewith, and transaction information, to the backend system 108. The transaction information can include, for example, an amount to be paid by the user 104 in completing the transaction.

At 410, the back end/adjudication system 108 can match the request received from the user 106 with the message received from the point-of-sale terminal 102, based on an identifier of the point-of-sale terminal 102 included in each message. In this way, a particular user 104 and/or device may be confidently associated by system 108 with a particular proposed transaction.

The acceptability of either message by the adjudication system 108, i.e., validity of any transaction so requested, if not matched within a pre-defined time period (e.g., a few minutes) may expire. If a match is not found at backend system 108, then transaction processing may be terminated at 420. In some embodiments, the backend system 110 may continue searching for a match for a pre-defined time period, may proactively query one or more merchant systems 102, 103, and/or request verification or authority to continue waiting from a user of the device 106, to allow for a delay between when the mobile device 106 transmits its message and when the point-of-sale terminal 102 transmits the corresponding message.

Optionally, at 412, the backend system 108 may transmit transaction validation signals to the mobile device 106, so as to cause, at 414, the mobile device 106 to request the user 104 to validate the transaction. At 416, upon receiving user validation, the mobile device 106 may transmit a message to the backend system 110 to indicate that the transaction has been approved, and at 418, the backend system 108 may process the transaction.

Payment Push Transaction: Pre-Authorized Transaction Workflow

Figure 5A:
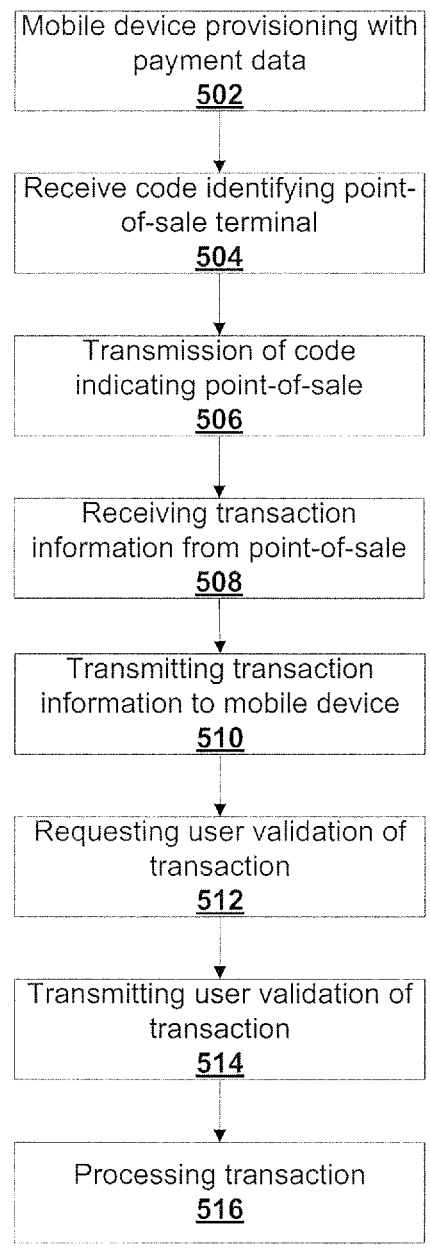
FIG. 5A is a schematic diagram of an embodiment of a process for conducting electronic transactions in accordance with various aspects of the invention.
Figure 5B:
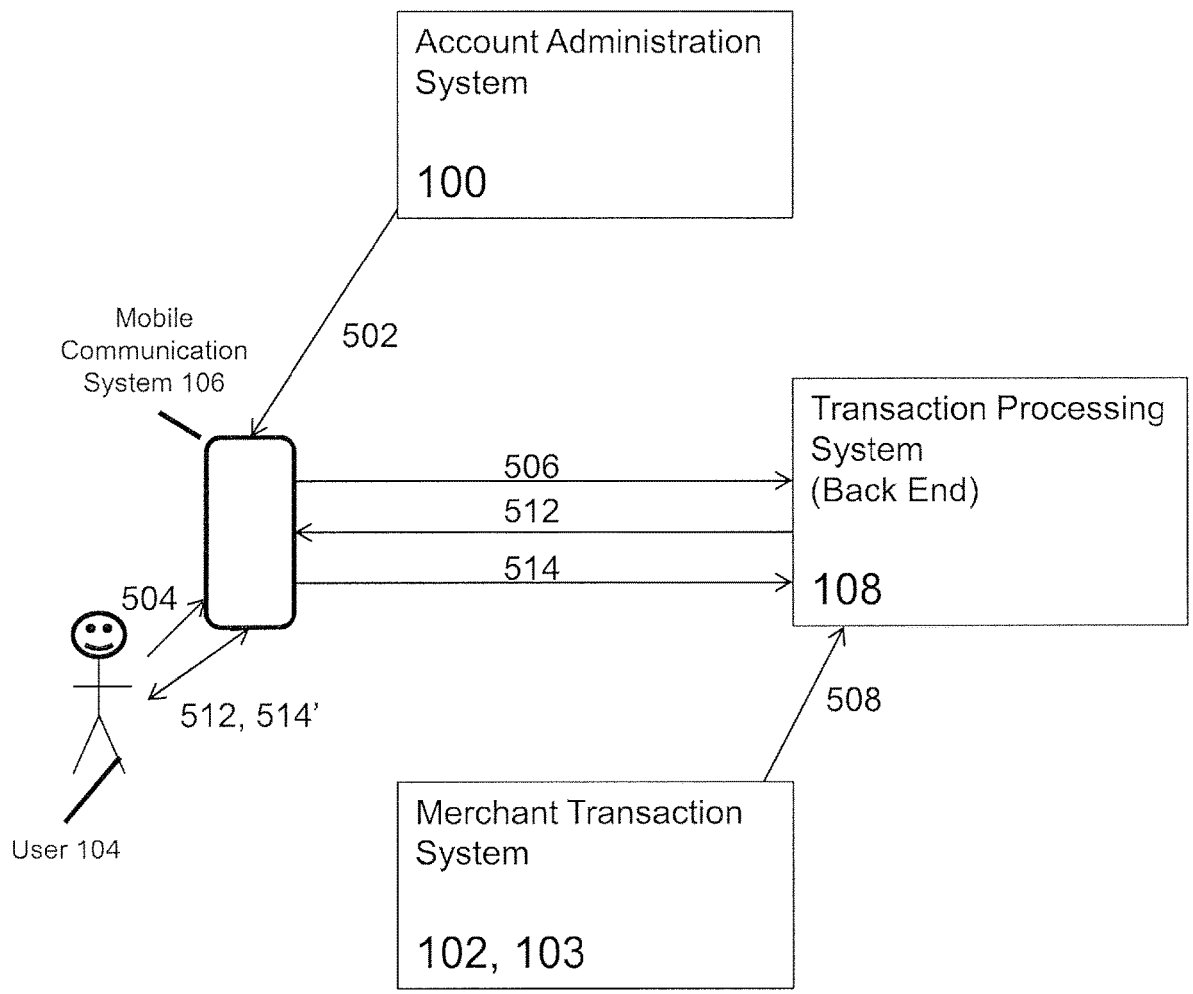
FIG. 5B is a schematic process flow diagram showing data communications flow consistent with the embodiment of FIG. 5A.

FIGS. 5A and 5B illustrate a sample workflow including steps for an embodiment where transaction may occur following the providing of the information identifying a point-of-sale terminal 102 by the mobile device 106.

For example, such a transaction can include the pre-authorization of a payment, such as the purchase of gasoline. A user can input or cause his/her device 106 to acquire a code or other identifier (which may be, for example, displayed proximate a particular gas pump at a gas station), and the user's mobile device may transmit a transaction purchase data set, or other message including information indicating the point-of-sale terminal 102 and/or merchant system 103, to an adjudication or other backend system 108.

Upon a subsequent purchase request at the same or a corresponding point-of-sale terminal 102 or merchant system 103, the point-of-sale terminal may transmit information to a backend system to indicate that a particular transaction has taken place at the point-of-sale terminal.

Optionally, the backend system 108 may then transmit a message to the mobile device 106 containing transaction-related information, such as the amount of the transaction, the time of the transaction, and various other details, and request the user's approval of the transaction.

Upon receipt of a request for approval, a notification may be displayed to the user wherein the user may choose to accept or decline the transaction. A message may be generated and transmitted by the mobile device to indicate whether the transaction was accepted or declined.

At 502, a user's transaction control device 106 may be provisioned for use with payment push. For example, the mobile device 106 may be provisioned by system 100 with a payment transaction data set for conducting a particular transaction in manners described above. Further, an application stored on the mobile device 106 may be configured to receive a code from a user 104.

At 504, the mobile device 106 may receive from a user 104 or otherwise acquire a code, which may be, for example, displayed proximate a particular gas pump at a gas station.

At 506, the user's controller 106 may transmit a message including the provisioned payment information and the information indicating the point-of-sale terminal 102 to a backend system 108. The backend system 108 may process the payment information to pre-authorize the transaction. The backend system 108 may send a message to point-of-sale terminal 102 indicating that a future transaction has been pre-authorized and is associated with the user 104.

In some embodiments, a point-of-sale terminal 102 may be configured to indicate that a next or other subsequent transaction has been authorized. For example, a gas station pump may turn on a light or output some other form of notification indicating to the user that the upcoming gas pumping transaction has been authorized. Optionally, a notification that the transaction has been authorized may be sent to the mobile device 106. The gas station pump may be unlocked or otherwise activated for use by the user 104.

In some embodiments, transaction data sets and other messages generated by or otherwise provided from the mobile device 106 may include a set of data elements related to the transaction (e.g. EMV data elements) and the backend system 108 may push this information to the point-of-sale terminal 102.

At 508, upon a transaction being conducted, the merchant system 102, 103 recognizes that the transaction has already been authorized and transmits transaction information to backend system 108. The transaction information includes, for example, an amount to be paid by the user 104.

Optionally, at 510, the backend system 108 may transmit transaction information to mobile device 106, and in some embodiments, at 512, the mobile device 106 may request the user 104 to validate the transaction. In some embodiments, validation may be deemed unnecessary (e.g. transaction values below a particular threshold).

Transaction information displayed to the user 104 through the mobile device 106 may include other information, such as advertising information, information indicating that a loyalty account was credited, a coupon applied, a gift card balance applied, etc.

At 514, upon receiving user validation, the mobile device 106 may transmit a message to the back end system 108 to indicate that the transaction has been approved. In some embodiments, for example, where the value of the transaction is above a threshold, the mobile device 106 may require further verification, such as the input of a PIN, a time sensitive code, a second password, etc.

At 516, the back end system 108 may then process the transaction using the payment information received at 506, with any appropriate adjustments from the pre-authorized amount.

Thus, reference to the disclosure above, including particularly the descriptions associated with FIGS. 3A-5B, it may be seen that in various aspects and embodiments the invention provides, among other improvements, mobile and other communication devices or controllers 106, each of which can comprise one or more network communication systems 811, data processors 822, input systems 815, 812, 808, 835 etc., and persistent memory devices 802, 804, 806, the memory devices comprising stored data representing instructions interpretable by the at least one processor and configured to cause the devices to receive, from the user input systems, data representing identifiers associated with merchant transaction processing systems 102, 103; generate transaction data sets comprising data representing the same or identifiers associated with the merchant transaction processing system(s) 102, 103 and pre-authorized transaction payment values; use the network communication systems to route the transaction data sets to third-party transaction adjudication systems 108 for adjudication of transactions associated with the transaction data sets; and receive from the transaction adjudication system data useful for confirming execution of the transactions.

Such controllers 106 may further include output display systems such as display screens 808, and be configured to use the data useful for confirming execution of the transaction received from the transaction adjudication systems to cause the output display systems to display, in human-interpretable form, requests for user validation of the transaction; to receive, from the same or other user input systems, such as keypads, touchscreens, or biometric sensors, data representing validation of the transactions; and generate and return to the adjudication system(s) 108 validation data sets suitable for causing the transactions to be completed.

As described above, identifiers associated with merchant systems 102, 103 in such devices 106 may include optical or other scanners 835 adapted to acquire data by optical, RFID, NFC, or other techniques.

Such devices 106 may further be configured to use their network communication systems 811 and/or optical output systems 808 to route to or otherwise provide for interpretation by the same other merchant transaction processing systems data useful for confirming execution of the transaction, so that, for example, a purchaser who has completed a transaction can satisfy a merchant official or security system that the purchaser has paid and is entitled to remove the purchased item(s) for the merchant's premises.

It may further be seen that, in related aspects, the invention provides transaction adjudication systems 108 comprising network communication systems suitably configured data processors, such that the adjudication systems 108 may be caused to receive, using their network communication systems, from one or more mobile communication devices or other purchaser controllers 106 purchaser transaction data sets, the purchaser transaction data sets comprising data representing at least identifier associated with merchant transaction processing systems 102, 103 and pre-authorized transaction payment values; use the same or other network communication systems to receive from the merchant transaction processing systems 102, 103 associated with the identifiers one or more merchant transaction data sets, the merchant transaction data sets comprising data representing at least transaction payment amounts and corresponding transaction identifiers and/or the same or further identifiers associated with the merchant transaction systems 102, 103; use the the purchaser transaction data sets and the merchant transaction data sets to authorize completion of a transaction and generate a transaction confirmation data set; and, using the same other network communication systems, route the transaction confirmation data sets to the respective mobile devices 106, merchant transaction processing systems 102, 103, and/or account administration processing system(s) 100, 114.

Such transaction adjudication systems 108 may be configured to trigger receipt from the merchant transaction processing systems 102, 103 of the merchant transaction data sets through the use of prompts through generation by the transaction adjudication systems of merchant transaction notification data sets and routing by the transaction adjudication systems 108 of the merchant transaction notification data sets to the merchant transaction processing system(s) 102, 103 associated with the identifiers, and the merchant transaction notification data sets include data representing at least identifier associated with the transaction processing systems; and identifier associated with the corresponding mobile communication devices.

Such transaction adjudication systems 108 may further generate and send to corresponding purchaser devices 106 data representing requests for validation of transactions, wherein authorization of the transactions is contingent upon receipt of suitable verification generated, e.g., by means of user entry of PIN, biometric, or other validating data.

Other Figures

FIG. 6 is a schematic diagram further illustrating possible data flows between various systems and/or components 100, 114, 106, 108, 102, 103, etc. during a payment flow pull transaction. Among other features, FIG. 6 illustrates processes for transfer of data between user devices 106 and merchant systems 102 by means of QR codes.

FIG. 7 is a schematic diagram illustrating the possible data flow between various systems and/or components during a payment flow push transaction. Among other features, FIG. 7 illustrates processes for transfer of data between user devices 106 and merchant systems 102 by means of QR codes, RFID/NFC devices, etc.

In both FIGS. 6 and 7 it is also shown that communications between adjudication or other third-party systems 108 and financial institutions or account administration systems 114 can be conducted in accordance with any desired transaction data protocols, or schemes, including for example EMV, FIX, etc.

Computer-Implemented Embodiments

With respect to computer-implemented embodiments, those skilled in the relevant arts, will understand that the description provided above describes how one could, for example, either build a purpose-specific computer system, and/or modify one or more existing computer or communication components to implement various aspects and embodiments of the invention.

Computer-related implementation and/or solutions may be commercially advantageous and provide unexpected and unforeseen advantages in various contexts; at least for the reasons of providing scalability (the use of a single platform/system to manage a large number of activities); the ability to quickly and effectively pull together information from disparate networks; improved decision support and/or analytics that would otherwise be unfeasible; the ability to integrate with external systems whose only connection points are computer-implemented interfaces; the ability to achieve cost savings through automation; the ability to dynamically respond and consider updates in various contexts (such as interactions with various external systems having dynamic information related to loyalty accounts, coupons, gift cards, promotions, further transaction validation, etc.); the ability to apply complex logical rules that would be infeasible through manual means; the ability to apply computerized technologies for increased privacy and security; among others.

Using electronic and/or computerized means to provide a platforms that may are more convenient, secure, scalable, efficient, accurate, and/or reliable than traditional, non-computerized means enables new, innovative, and commercially desirable efficiencies and operational possibilities. Further, many systems may be computerized and the platform may advantageously be designed for interoperability, and manual operation may be difficult and/or impossible.

Scalability may be useful as it may be advantageous to provide a system that may be able to effectively manage a large number of transactions and/or interconnections and/or integration with external systems. A potential advantage of some embodiments over conventional solutions is the ability to receive a large number of transactions and to process these transactions in a commercially reasonable period of time.

The convenience and effectiveness of a solution may be valuable in the context of electronic payments as individuals often make many electronic payments over the course of a day, even a small improvement in convenience on each transaction may become more significant taken in the context of a high volume of transactions.

General

As will be further understood by those skilled in the relevant arts, significant advantage may be realized through the full or partial automation of any of the processes described above, or portions thereof. Such automation may be implemented by, for example, the automatic generation and application of rules through programming logic and/or workflows. Such automation may be provided in any suitable manner, including for example the use of automatic data processors executing suitably-configured, coded, machine-readable instructions using a wide variety of devices. Processor(s) suitable for use in such implementations can comprise any one or more data processor(s), computer(s), and/or other system(s) or device(s), and necessary or desirable input/output, communications, control, operating system, and other devices or components, including software, that are suitable for accomplishing the purposes described herein. For example, a suitably-programmed data processor provided on one or more circuit boards will suffice.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The present system and method may be practiced in various embodiments. A suitably configured computer device, and associated communications networks, devices, software and firmware may provide a platform for enabling one or more embodiments as described above.

Figure 8:
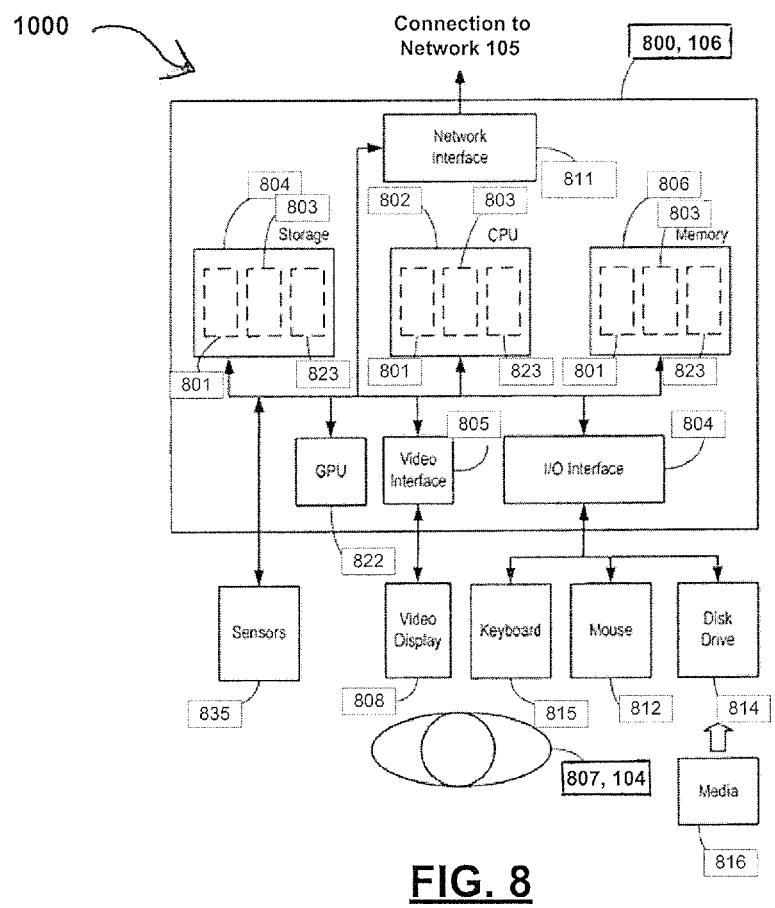
FIG. 8 is a schematic diagram of a system for processing electronic transactions in accordance with various aspects and embodiments of the invention, including namely a computer device, and associated communications networks, devices, software and firmware that may be configured to provide a platform for implementing one or more aspects and embodiments of the invention.

By way of example, FIG. 8 shows a user communication device or controller 800, 106 that may include a central processing unit ("CPU") 802 connected to a storage unit 804 and to a random access memory 806. The CPU 802 may process an operating system 801, application program 803, and data 823. The operating system 801, application program 803, and data 823 may be stored in persistent memory storage unit 804 and loaded into memory 806, as may be required. Computer device 800 may further include a graphics processing unit (GPU) 822 which is operatively connected to CPU 802 and to memory 806 to offload intensive image processing calculations from CPU 802 and run these calculations in parallel with CPU 802. A user or operator 807, 104 may interact with the computer device 800, 106 using a video display input/output device 808 connected by a video interface 805, and various input/output devices such as a keyboard or keypad 815, mouse or pointing device 812, and disk drive or solid state drive 814 connected by an I/O interface 809. In known manner, the pointing device 812 may be configured to control movement of a cursor in the video display 808, and to operate various graphical user interface (GUI) controls appearing in the video display 808 with a mouse button. The disk drive or solid state drive 814 may be configured to accept computer readable media 816. The computer device 800 may form part of a network 105 via a network interface 811, allowing the computer device 800 to communicate with other suitably configured data processing systems (not shown). One or more different types of sensors 835 may be used to receive input from various sources.

Various aspects and embodiments of the present systems and methods may be practiced on virtually any manner of computer devices, including desktop computers, laptop computers, tablet computers, and/or wireless handheld devices. The present system and method may also be implemented as a computer-readable/useable medium that includes computer program code to enable one or more computer devices to implement each of the various process steps in a method in accordance with the present invention. In case of more than computer devices performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

The mobile application of the present invention may be implemented as a web service, where the mobile device includes a link for accessing the web service, rather than a native application.

The functionality described may be implemented to any mobile platform, including the iOS™ platform, ANDROID™, WINDOWS™ or BLACKBERRY™.

It will be appreciated by those skilled in the art that other variations of the embodiments described herein may also be practiced without departing from the scope of the invention. Other modifications are therefore possible.

In further aspects, the disclosure provides systems, devices, methods, and computer programming products, including non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be understood by those skilled in the relevant arts, with respect to both processes and any systems, devices, etc., described herein, a wide range of variations is possible, and even advantageous, in various circumstances, without departing from the scope of the invention, which is to be limited only by the claims.

What is claimed is:

1. A first user mobile communication device comprising:
   at least one wireless transceiver;
   at least one data processor;
   at least one user input system, and
   at least one persistent memory device, the at least one persistent memory device comprising stored data representing at least:
   at least one authorization data set configurable to comprise data representing at least an authorized transaction limit, a delimiter operand for limiting a tokenized transaction data set, a location reference for denoting an external memory location where transaction payment data is stored, and one or more secure identifiers associated with a transaction payment account; and one or more sets of machine-interpretable instructions;
the at least one data processor adapted, by execution of the one or more sets of stored, machine-interpretable instructions to:
receive a payment transaction request from a second user mobile communication device, the transaction request comprising data elements associated with a payment transaction between the second user mobile communication device and a merchant system, said data elements including at least a transaction value and a merchant identifier;
access the at least one authorization data set;
generate a tokenized transaction data set using the accessed at least one authorization data set, the tokenized transaction data set comprising data representing an authorized transaction value, the delimiter operand, the location reference, the merchant identifier, and at least one secure identifier comprising data from the at least one authorization data set, the tokenized transaction data set useable by a transaction adjudication system for adjudicating completion of the payment transaction, wherein the delimiter operand is configured to control the adjudication of the transaction by the transaction adjudication system;
route the tokenized transaction data set to the second user mobile communication device, via the at least one wireless transceiver, for use in completing the payment transaction using the transaction payment account, wherein the merchant system securely obtains the transaction payment data from the external memory location associated with the location reference when the second mobile communication device routes the tokenized transaction data set to the transaction adjudication system; and
receive a message comprising an indication of an outcome of the transaction, the message received from at least one of:
the transaction adjudication system;
the merchant system; or
the second user mobile device.

2. The first user mobile communication device of claim 1, wherein the tokenized transaction data set is in a format suitable for use by the second user mobile communication device in generating a machine-readable optical object comprising elements representing the tokenized transaction data set.

3. The first user mobile communication device of claim 2, wherein the machine-readable optical object comprises a bar code or a Quick Response (QR) code.

4. The first user mobile communication device of claim 1, wherein the delimiter operand comprises a single-use delimiter.

5. The first user mobile communication device of claim 1, wherein the delimiter operand comprises a time delimiter.

6. The first user mobile communication device of claim 1, wherein the tokenized transaction data set comprises data interpretable by the transaction adjudication system as instructions associated with completion of the payment transaction.

7. The first user mobile communication device of claim 1, wherein the stored data representing instructions interpretable by the at least one data processor are further configured to cause the first user mobile communication device to receive, from at least one of the transaction adjudication system and the second user mobile communication device, data representing at least one reward associated with completion of the payment transaction.

8. The first user mobile communication device of claim 1, comprising at least one network communication system, and wherein the at least one data processor causes the first user mobile communication device to access at least a part of the data representing an authorized transaction data set using the network communication system.

9. The first user mobile communication device of claim 1, wherein the authorized transaction limit is equal to the authorized transaction value.

10. The first user mobile communication device of claim 1, wherein the authorized transaction limit is greater the authorized transaction value.

11. The first user mobile communication device of claim 1, wherein at least one of the authorized transaction limit and the authorized transaction value is generated using signals received from the user input system.

12. A first user mobile communication device comprising:
at least one wireless transceiver;
at least one data processor;
at least one user input system, and
at least one persistent memory device, the at least one persistent memory device comprising stored data representing at least:
at least one authorization data set configurable to comprise data representing at least an authorized transaction limit, a delimiter operand for limiting a tokenized transaction data set, a location reference for denoting an external memory location where transaction payment data is stored, and one or more secure identifiers associated with a transaction payment account; and
one or more sets of machine-interpretable instructions;
the at least one data processor adapted, by execution of one or more sets of stored, machine-interpretable instructions to:
receive payment transaction details from a merchant device for a payment transaction, the payment transaction details comprising at least a transaction value and a merchant identifier;
send a payment transaction request to a second user mobile communication device, the transaction request comprising data elements associated with the payment transaction with the merchant system, said data elements including at least the transaction value and the merchant identifier;
receive from the second user mobile communication device data representing a tokenized transaction data set, the tokenized transaction data set comprising data representing an authorized transaction value, the delimiter operand, the location reference, the merchant identifier, and at least one secure identifier, the tokenized transaction data set useable by a transaction adjudication system for adjudicating completion of the payment transaction, wherein the delimiter operand is configured to control the adjudication of the transaction by the transaction adjudication system;
route the tokenized transaction data set to the transaction adjudication system, via the at least one wireless transceiver, for use in adjudicating the payment transaction using the transaction payment account, wherein the merchant system securely obtains the transaction payment data from the external memory location associated with the location reference when the second mobile communication device routes the tokenized transaction data set to the transaction adjudication system; and receive a message comprising an indication of an outcome of the transaction, the message received from at least one of:
the transaction adjudication system;
the merchant system; and
the second user mobile device.

13. The first user mobile communication device of claim 12, wherein the tokenized transaction data set is output by the at least one wireless transceiver in a format suitable for use by the second user mobile communication device in generating a machine-readable optical object comprising elements representing the tokenized transaction data set.

14. The first user mobile communication device of claim 13, wherein the machine-readable optical object comprises a bar code or a Quick Response (QR) code.

15. The first user mobile communication device of claim 12, wherein the delimiter operand comprises a single-use delimiter or a time delimiter.

16. The first user mobile communication device of claim 12, wherein the stored data representing instructions interpretable by the at least one data processor are further configured to cause the first user mobile communication device to:

using at least one of the wireless transceiver and a network communication system, receive from the transaction adjudication system data representing confirmation of the completion of the payment transaction,
generate a transaction confirmation data set; and
output the transaction confirmation data set to the second user mobile communication device, using at least one of the wireless data output system and the same or another network communication system.

17. The first user mobile communication device of claim 12, wherein the transaction adjudication system comprises a merchant transaction processing system.

18. The first user mobile communication device of claim 12, wherein the stored data representing instructions interpretable by the at least one data processor are further configured to cause the first user mobile communication device to:

output to the same or another merchant transaction processing system data useful for confirming execution of the transaction set to the second user mobile communication device, using at least one of the wireless data output system and the same or another network communication system.

* * * * *